(12) United States Patent
Wilkinson et al.

(10) Patent No.: US 10,496,099 B2
(45) Date of Patent: Dec. 3, 2019

(54) SYSTEMS AND METHODS FOR SPEED LIMIT CONTEXT AWARENESS

(71) Applicant: UATC, LLC, San Francisco, CA (US)

(72) Inventors: Eric Llyod Wilkinson, Pittsburgh, PA (US); David McAllister Bradley, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 112 days.

(21) Appl. No.: 15/652,654

(22) Filed: Jul. 18, 2017

(65) Prior Publication Data

US 2019/0025843 A1    Jan. 24, 2019

(51) Int. Cl.
*G05D 1/02* (2006.01)
*G01C 21/34* (2006.01)
(Continued)

(52) U.S. Cl.
CPC ....... *G05D 1/0223* (2013.01); *G01C 21/3407* (2013.01); *G01C 21/3626* (2013.01);
(Continued)

(58) Field of Classification Search
CPC .. G05D 1/0223; G05D 1/0088; G05D 1/0055; G05D 1/0214; G05D 1/0221; G05D 1/0231; G05D 1/0246; G05D 1/0253; G06N 20/00; G06N 3/00; G06N 5/046; B60W 50/045; B60W 50/0097; B60W 30/09;
(Continued)

(56) References Cited

U.S. PATENT DOCUMENTS 9,168,868 B2 * 10/2015 Stein ................... G08G 1/16
9,669,827 B1 * 6/2017 Ferguson ............ B60W 30/09
(Continued)

FOREIGN PATENT DOCUMENTS

WO    WO 2017120336        7/2017
WO    WO-2017120336 A2 *   7/2017    ....... B60W 30/0953

OTHER PUBLICATIONS

Rojas, Raul, "Statistics and Neural Networks," Neural Networks—A Systematic Introduction, Chapter 9, https://page.mi.fu-berlin.de/rojas/neural/chapter/K9.pdf, Berlin, Germany, Jul. 12, 1996, 35 pages.

(Continued)

*Primary Examiner* — Rachid Bendidi
(74) *Attorney, Agent, or Firm* — Dority & Manning, PA

(57) ABSTRACT

Systems and methods are directed to providing speed limit context awareness during operation of an autonomous vehicle. In one example, a computer-implemented method for applying speed limit context awareness in autonomous vehicle operation includes obtaining, by a computing system comprising one or more computing devices, a plurality of features descriptive of a context and a state of an autonomous vehicle. The method further includes determining, by the computing system, a context response for the autonomous vehicle based at least in part on a machine-learned model and the plurality of features, wherein the context response includes a derived speed constraint for the autonomous vehicle. The method further includes providing, by the computing system, the context response to a motion planning application of the autonomous vehicle to determine a motion plan for the autonomous vehicle.

17 Claims, 12 Drawing Sheets

(51) Int. Cl.
  *G01C 21/36* (2006.01)
  *G06N 20/00* (2019.01)
  *G05D 1/00* (2006.01)
  *G08G 1/16* (2006.01)
  *G08G 1/0967* (2006.01)
(52) U.S. Cl.
  CPC ......... *G05D 1/0088* (2013.01); *G05D 1/0212* (2013.01); *G06N 20/00* (2019.01); *G05D 2201/0213* (2013.01); *G08G 1/096791* (2013.01); *G08G 1/163* (2013.01); *G08G 1/165* (2013.01); *G08G 1/166* (2013.01)
(58) Field of Classification Search
  CPC . B60W 30/0956; B60W 30/053; G01C 21/34; G01C 21/3453; G01C 21/3602; G06K 9/00825; G06K 9/00805; G06K 9/00798; G06K 9/00791
  See application file for complete search history.

(56) References Cited

U.S. PATENT DOCUMENTS

| | | |
|---|---|---|
| 2007/0152804 A1 | 7/2007 | Breed et al. |
| 2015/0197248 A1 | 7/2015 | Breed et al. |
| 2016/0096272 A1* | 4/2016 | Smith ............... B25J 9/163 |
| | | 700/253 |
| 2017/0123429 A1* | 5/2017 | Levinson ........... G05D 1/0088 |
| 2017/0277192 A1* | 9/2017 | Gupta ............... B60W 30/20 |
| 2017/0277193 A1* | 9/2017 | Frazzoli ............ G05D 1/0214 |
| 2018/0032082 A1* | 2/2018 | Shalev-Shwartz ................ |
| | | B60W 30/0953 |

OTHER PUBLICATIONS

PCT International Search Report and Written Opinion for PCT/US2018/042600, dated Oct. 31, 2018, 12 pages.

* cited by examiner

SYSTEMS AND METHODS FOR SPEED LIMIT CONTEXT AWARENESS

FIELD

The present disclosure relates generally to controlling autonomous vehicle travel. More particularly, the present disclosure relates to systems and methods that include and/or leverage machine-learned models to provide speed limit context awareness in determining and controlling autonomous vehicle driving speeds.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method of for applying speed limit context awareness in autonomous vehicle operation. The method includes obtaining, by a computing system comprising one or more computing devices, a plurality of features descriptive of a context and a state of an autonomous vehicle. The method further includes determining, by the computing system, a context response for the autonomous vehicle based at least in part on a machine-learned model and the plurality of features, wherein the context response includes a derived speed constraint for the autonomous vehicle. The method further includes providing, by the computing system, the context response to a motion planning application of the autonomous vehicle to determine a motion plan for the autonomous vehicle.

Another example aspect of the present disclosure is directed to an autonomous vehicle. The autonomous vehicle includes a machine-learned model that has been trained to determine a context response based at least in part on features associated with a context and a state of the autonomous vehicle. The autonomous vehicle further includes a vehicle computing system including one or more processors; and one or more memories including instructions that, when executed by the one or more processors, cause the one or more processors to perform operations. The operations include obtaining a plurality of features descriptive of the context and the state of the autonomous vehicle. The operations further include generating a feature vector based at least in part on the plurality of features. The operations further include inputting the feature vector to the machine-learned model. The operations further include obtaining a context response as an output of the machine-learned model, wherein the context response includes a derived speed constraint for the autonomous vehicle. The operations further include providing the context response to a motion planning application of the autonomous vehicle to determine a motion plan for the autonomous vehicle.

Another example aspect of the present disclosure is directed to a computing system. The computing system includes one or more processors and one or more memories including instructions that, when executed by the one or more processors, cause the one or more processors to perform operations. The operations include obtaining a plurality of features descriptive of a context and a state of an autonomous vehicle. The operations further include determining a context response for the autonomous vehicle based at least in part on a machine-learned model and the plurality of features, wherein the context response includes a derived speed constraint for the autonomous vehicle. The operations further include providing the context response to a motion planning application of the autonomous vehicle to determine a motion plan for the autonomous vehicle.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
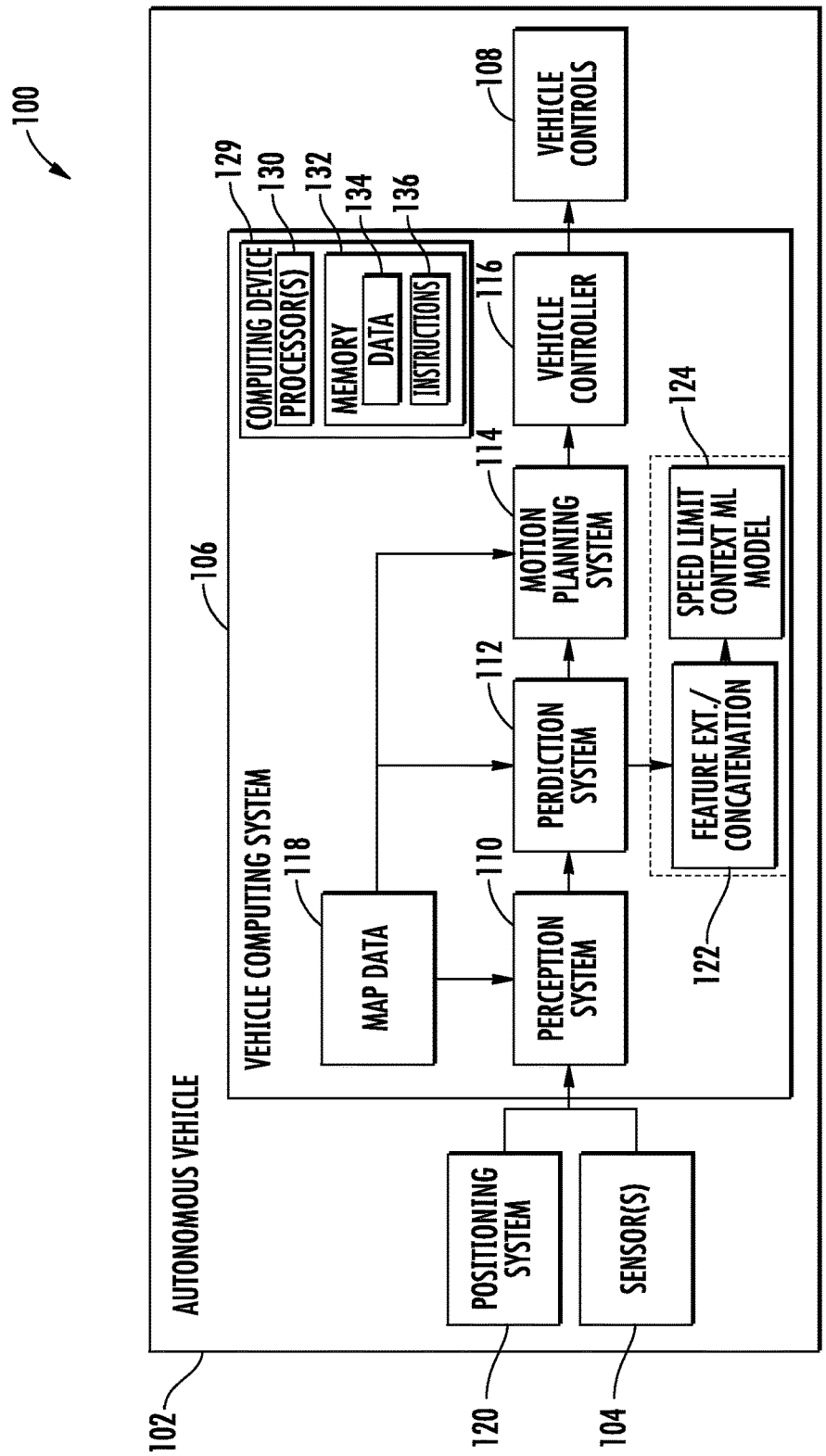
FIG. 1 depicts a block diagram of an example system for controlling the navigation of a vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to systems and methods that include and/or leverage machine-learned models to provide speed limit context awareness in determining and controlling autonomous vehicle travel speeds. In particular, the systems and methods of the present disclosure can determine a maximum speed limit prediction for an autonomous vehicle in one or more segments of the vehicle's nominal path based on the context and environment surrounding the vehicle. For instance, an autonomous vehicle computing system can obtain information regarding the context around the autonomous vehicle. The autonomous vehicle computing system can determine a plurality of features associated with the autonomous vehicle context. For example, such features can include features regarding aggregate information about objects in a context region around the nominal path (e.g., pedestrians, vehicles, path boundaries, and/or the like) and/or features that are relative to the vehicle current position (e.g., posted speed limit, distances to traffic control devices, distances to other queued objects, and/or the like). To determine appropriate driving speed predictions for the autonomous vehicle, the autonomous vehicle computing system can include a machine-learned model that has been trained to determine driving speed predictions for regions of the vehicle's nominal path based at least in part on the obtained features. For example, the features can be provided to the machine-learned model as input (e.g., as a feature vector) and can be analyzed using the machine-learned model to predict a maximum speed limit value to be applied for the autonomous vehicle at a future moment, for example, to be applied one second in the future. In another example, the machine-learned model could predict a speed limit to be applied for each segment of the path ahead of the autonomous vehicle based on the obtained features. Alternatively or additionally, the machine-learned model could provide a target offset from the nominal path based on the obtained features, for example, to optimize the positioning of the autonomous vehicle in a roadway based on the context around the vehicle. In this way, the autonomous vehicle can use context awareness in limiting the travel speed and/or biasing the lane position and thereby achieve safer driving behavior.

In particular, an autonomous vehicle may be traveling a nominal path where operation of the autonomous vehicle at a posted speed limit may not be feasible and/or desirable based on various conditions along segments of the path such that it would be desirable to operate the autonomous vehicle at a modified (e.g., reduced) driving speed based on the current context of the path segments, for example, where a human driver having awareness of the environment might naturally drive below the posted speed limit. As one example, an autonomous vehicle may be required to travel through a narrow region of the nominal path due to objects in a segment of the path (e.g., other vehicles, pedestrians, etc.) and/or properties of the path (e.g., road boundaries, etc.), and as such, it may be desirable for the autonomous vehicle to travel through the narrow region at a speed below a posted speed. As another example, some regions of a nominal path may include one or more occlusions (e.g., parked vehicles, large vehicles, buildings, signs, etc.) that limit the visibility within the region and as such, it may be desirable for the autonomous vehicle to travel through the region that is visibly occluded at a speed below a posted speed. In another example, an autonomous vehicle may be required to travel through regions of a nominal path having a complex environment, for example, a busy street where there may be narrow travel lanes, numerous parked vehicles, pedestrians, bicyclists, and/or the like, such that it may be desirable for the autonomous vehicle to travel through the region at a speed below a posted speed.

Accordingly, in some embodiments, a vehicle computing system of an autonomous vehicle can determine a maximum speed limit, and/or an offset from the nominal path, for a path segment based at least in part on the context around the autonomous vehicle. As one example, in some embodiments, a vehicle computing system can include one or more machine-learned models that can receive as input a plurality of features describing the context around the autonomous vehicle and provide as output a maximum speed limit prediction, and/or a nominal path offset prediction, that can be applied by the autonomous vehicle for a path segment at a particular moment, for example, one second in the future. In particular, the features can include information about pedestrians in a path segment, parked and/or moving vehicles in a path segment, the shape of the path segments (e.g., road boundaries), a distance to a next traffic control device, crosswalk, etc., a speed of a preceding vehicle, and/or the like. The machine-learned model can be used to analyze the plurality of features and provide as output a prediction of a maximum speed limit that can be applied by the autonomous vehicle at some point in the future (e.g., a speed limit to be applied to the vehicle operation one second in the future, speed limits to be applied for one or more upcoming segments of the path, and/or the like). Additionally or alternatively, in some embodiments, the machine-learned model can provide as output a target offset from the nominal path to be applied at some point in the future (e.g., to be applied one second in the future, to be applied at determined distance ahead, and/or the like) based on the features.

More particularly, an autonomous vehicle (e.g., a ground-based vehicle, air-based vehicle, or other vehicle type) can include a variety of systems onboard the autonomous vehicle to control the operation of the vehicle. For instance, the autonomous vehicle can include one or more data acquisition systems (e.g., sensors, image capture devices), one or more vehicle computing systems (e.g. for providing autonomous operation), one or more vehicle control systems, (e.g., for controlling acceleration, braking, steering, etc.), and/or the like. The data acquisition system(s) can acquire sensor data (e.g., lidar data, radar data, image data, etc.) associated with one or more objects (e.g., pedestrians, vehicles, etc.) that are proximate to the autonomous vehicle and/or sensor data associated with the vehicle path (e.g., path shape, boundaries, markings, etc.). The sensor data can include information that describes the location (e.g., in three-dimensional space relative to the autonomous vehicle) of points that correspond to objects within the surrounding environment of the autonomous vehicle (e.g., at one or more times). The data acquisition system(s) can provide such sensor data to the vehicle computing system.

In addition to the sensor data, the vehicle computing system can obtain map data that provides other detailed information about the surrounding environment of the autonomous vehicle. For example, the map data can provide information regarding: the identity and location of various roadways, road segments, buildings, or other items; the location and direction of traffic lanes (e.g. the boundaries, location, direction, etc. of a travel lane, parking lane, a turning lane, a bicycle lane, and/or other lanes within a particular travel way); traffic control data (e.g., the location and instructions of signage, traffic signals, and/or other traffic control devices); and/or any other map data that provides information that can assist the autonomous vehicle in comprehending and perceiving its surrounding environment and its relationship thereto.

The vehicle computing system can include one or more computing devices and include various subsystems that can cooperate to perceive the surrounding environment of the autonomous vehicle and determine a motion plan for controlling the motion of the autonomous vehicle. For instance, the vehicle computing system can include a perception system, a prediction system, and a motion planning system. The vehicle computing system can receive and process the sensor data to generate an appropriate motion plan through the vehicle's surrounding environment.

The perception system can detect one or more objects that are proximate to the autonomous vehicle based on the sensor data. In particular, in some implementations, the perception system can determine, for each object, state data that describes a current state of such object. As examples, the state data for each object can describe an estimate of the object's: current location (also referred to as position); current speed/velocity; current acceleration; current heading; current orientation; size/footprint; class (e.g., vehicle class versus pedestrian class versus bicycle class, etc.); and/or other state information. In some implementations, the perception system can determine state data for each object over a number of iterations. In particular, the perception system can update the state data for each object at each iteration. Thus, the perception system can detect and track objects (e.g., vehicles, bicycles, pedestrians, etc.) that are proximate to the autonomous vehicle over time, and thereby produce a presentation of the world around an autonomous vehicle along with its state (e.g., a presentation of the objects within a scene at the current time along with the states of the objects).

The prediction system can receive the state data from the perception system and predict one or more future locations for each object based on such state data. For example, the prediction system can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system can determine a motion plan for the autonomous vehicle based at least in part on predicted one or more future locations for the object and/or the state data for the object provided by the perception system. Stated differently, given information about the current locations of objects and/or predicted future locations of proximate objects, the motion planning system can determine a motion plan for the autonomous vehicle that best navigates the autonomous vehicle along the determined travel route relative to the objects at such locations.

As one example, in some implementations, the motion planning system can determine a cost function for each of one or more candidate motion plans for the autonomous vehicle based at least in part on the current locations and/or predicted future locations of the objects. For example, the cost function can describe a cost (e.g., over time) of adhering to a particular candidate motion plan. For example, the cost described by a cost function can increase when the autonomous vehicle approaches impact with another object and/or deviates from a preferred pathway (e.g., a predetermined travel route).

Thus, given information about the current locations and/or predicted future locations of objects, the motion planning system can determine a cost of adhering to a particular candidate pathway. The motion planning system can select or determine a motion plan for the autonomous vehicle based at least in part on the cost function(s). For example, the motion plan that minimizes the cost function can be selected or otherwise determined. The motion planning system then can provide the selected motion plan to a vehicle controller that controls one or more vehicle controls (e.g., actuators or other devices that control acceleration, steering, braking, etc.) to execute the selected motion plan.

More particularly, in some implementations, the perception system, prediction system, and/or motion planning system can determine one or more features associated with objects and/or the roadway in the surrounding environment of the autonomous vehicle, for example, based at least in part on the state data. In some implementations, the perception system, prediction system, and/or motion planning system can determine the features based at least in part on other information, such as acquired map data. The features can be indicative of the context around the autonomous vehicle along the nominal path and/or the autonomous vehicle current state.

For instance, in some implementations, the features can be determined from aggregate information about the autonomous vehicle's position in the world and the relationship between the objects in the surrounding environment and the nominal path. In some implementations, the features can fall into two categories: autonomous vehicle features and context features. Autonomous vehicle features can include features that only occur once in a scene and are relative to the autonomous vehicle's current position/state. Context features can include aggregate information about the other objects in the scene in some context region along/around the nominal path. For instance, there can be a number of tiled context regions along the nominal path ahead of the autonomous vehicle which can be of a configurable length and radius and context features can be determined for each region.

In particular, in some implementations, the surrounding environment of the autonomous vehicle (e.g., a nominal path for the autonomous vehicle and a certain radius surrounding the vehicle and the path) can be divided into a series of segments or bins. For example, the nominal path of the autonomous vehicle can be divided into a plurality of defined length segments, such as 10 meters, 15 meters, etc., each segment being a context region for speed limit context awareness. Each segment or context region can be used to group together information about features including objects (e.g., pedestrians, vehicles, etc.), path properties (e.g., nominal path geometrical properties), road boundaries (e.g., distances to road/lane boundaries, etc.), and/or the like. For instance, context regions can be defined by start/end locations on the nominal path along with a radius around the path which defines which objects can be considered part of the context region.

In some implementations, autonomous vehicle features (e.g., features determined with respect to the current autonomous vehicle state) can include one or more of: a posted speed limit; distance to traffic control device (e.g., stop sign, yellow light, red light, etc.); distance from nose of the autonomous vehicle to a closest queue object (e.g., other vehicle, etc.) along the nominal path; speed of the closest queue object (e.g., speed toward path, speed along path, etc.); acceleration of the closest queue object (e.g., acceleration toward path, acceleration along path, etc.); and/or the like.

In some implementations, context features (e.g., features determined with respect to a region along the nominal path) can include one or more of: average distance to pedestrians on the left/right; speed of closest pedestrian on the left/right; distance to nominal path of the closest pedestrian on the left/right; distribution of pedestrians to the left/right of the nominal path; average distance to other vehicles on the left/right; speed of closest other vehicle on the left/right; distance to nominal path of the closest other vehicle on the left/right; distribution of other vehicles to the left/right of the nominal path; maximum curvature along nominal path in context region; closest distance between road boundary to the left and the autonomous vehicle in context region; average distance to the left; closest distance between road boundary to the right and the autonomous vehicle in context region; average distance to the right; a rendered overhead-view image of the upcoming path; an actual camera image in the direction of the future path; and/or the like.

In particular, in some implementations, the vehicle computing system can divide the nominal path into a plurality of regions (e.g., n bins of x length) and compute statistics and features (e.g., associated with pedestrians, vehicles, road boundaries, etc.) to the left and right of the autonomous vehicle inside each region. For example, the vehicle computing system can configure a number of bins for objects (e.g., pedestrians, vehicles, etc.) in the nominal path and assign the objects to the bins to compute statistics and features. The vehicle computing system can also determine a closest pedestrian and a closest vehicle to the autonomous vehicle within a region (e.g., inside a bin), for example. Additionally, some features can be determined without binning, such as autonomous vehicle features (e.g., posted speed limit, distance to traffic control device, distance to crosswalk, distance to vehicle in front, speed of vehicle in front, etc.) that may appear once within a current autonomous vehicle scene. Alternatively, in some implementations, features can be obtained using a convolutional neural network feature extractor.

The vehicle computing system can concatenate the plurality of features into one feature vector for use as input to a machine-learned model for determining a maximum speed limit prediction and/or a minimum offset from nominal path prediction for the autonomous vehicle. For example, the vehicle computing system can generate a feature vector of cat(autonomous_vehicle_features, context_features_region_1, context_features_region_2 . . . context_features_region_n) and input this feature vector into a machine-learned model to generate a speed limit prediction. As an example, the feature vector can comprise a concatenation of one or more autonomous_vehicle_features, such as posted speed limit, distance to stop sign, distance to yellow signal, distance to red signal, distance from front of vehicle to closet queue object in scene, speed of closest queue object toward nominal path, speed of closest queue object along nominal path, acceleration of closest queue object toward nominal path, acceleration of closest queue object along nominal path, and/or the like, as well as one or more context features for the plurality of regions/bins, such as average distance to pedestrians on left, average distance to pedestrians on right, speed of closest pedestrian on left, speed of closest pedestrian on right, distance to nominal path of closest pedestrian on left, distance to nominal path of closest pedestrian on right, count of pedestrians to left in bin 1, count of pedestrians to left in bin 2, count of pedestrians to left in bin 3, count of pedestrians to left in bin 4, count of pedestrians to right in bin 1, count of pedestrians to right in bin 2, count of pedestrians to right in bin 3, count of pedestrians to right in bin 4, and/or the like, as well as one or more context features for the plurality of regions/bins, such as average distance to other vehicles on left, average distance to other vehicles on right, speed of closest other vehicle on left, speed of closest other vehicle on right, distance to nominal path of closest other vehicle on left, distance to nominal path of closest other vehicle on right, count of other vehicles to left in bin 1, count of other vehicles to left in bin 2, count of other vehicles to left in bin 3, count of other vehicles to left in bin 4, count of other vehicles to right in bin 1, count of other vehicles to right in bin 2, count of other vehicles to right in bin 3, count of other vehicles to right in bin 4, minimum gap for objects in context region, maximum curvature along nominal path in context region, closest distance between road boundary and vehicle in context region on left, average distance between road boundary and vehicle in context region on left, closest distance between road boundary and vehicle in context region on right, average distance between road boundary and vehicle in context region on right, and/or the like. The feature vector comprising a concatenation of the plurality of autonomous_vehicle_features and context features can then be provided for use in determining a maximum speed limit prediction and/or a minimum offset from nominal path prediction for the autonomous vehicle.

In particular, the vehicle computing system can determine a maximum speed limit and/or a nominal path offset for the autonomous vehicle based at least in part on the features. To do so, the vehicle computing system can include, employ, and/or otherwise leverage a model, such as a machine-learned model. For example, the machine-learned model can be or can otherwise include one or more various model(s) such as, for example, neural networks (e.g., deep neural networks), or other multi-layer non-linear models. Neural networks can include recurrent neural networks (e.g., long, short-term memory recurrent neural networks), feed-forward neural networks, convolutional neural networks, and/or other forms of neural networks.

For instance, supervised training techniques can be performed to train the model (e.g., using labeled driving log data, etc.) to determine a maximum speed limit prediction based at least in part on the features associated with a context region and the autonomous vehicle current position. The vehicle computing system can input data indicative of at least the features (e.g., a feature vector) into the machine-learned model and receive, as an output, data indicative of a recommended maximum speed limit. Additionally, or alternatively, the vehicle computing system can input data indicative of at least the features (e.g., a feature vector) into the machine-learned model and receive, as an output, data indicative of a nominal path offset.

In some implementations, a machine-learned model can be implemented as a regression problem, where the desired output from the machine-learned model is an exact speed limit. Alternatively, a machine-learned model can be implemented as a classification problem, for example, having a range (e.g., 0 to 25 mph) and a special token, where if the response is not in the range, an exact speed limit would be output. For instance, a speed limit range can be divided into bins, for example, of 2.5 mph width, with the speed labels being used for assignments into the bins and a special label being used when a labeler specified that no caution is needed (e.g., there is no reason for the speed to be reduced based on the context). If a probability of "no caution" is above a threshold (e.g., indicating that there is nothing to slow down for based on the context of the scene), then a posted speed limit can be used as the maximum speed limit. Alternatively, if the probability of "no caution" is below the threshold, then a probability distribution can be computed over the speed limit bins (e.g., the 2.5 mph increments) to determine a maximum speed limit. In some implementations, the mean of the probability distribution over the bins can be used as the maximum speed limit.

More particularly, the machine-learned model(s) can be trained using ground truth labels (e.g., providing speed labels based on particular contexts/situations) from one or more sources such that the machine-learned model can "learn" suitable speed for an autonomous vehicle to be driven given certain scenarios. In some implementations, the training data for the machine-learned model(s) can include continuous labels over sequences, for example absolute speed and distance, versus discrete decisions.

In particular, in some implementations, model training data can be generated from driving logs. For example, data can be captured when a vehicle changes speed and this data can be used to generate driving sequences that can then be labeled for training a machine-learned model. In another example, event data can be analyzed for certain situations and the data can be used to generate driving sequences that can then be labeled for training a machine-learned model. As another example, manually driven vehicle data can be captured, for instance, when a vehicle is going below a posted speed limit with/without another vehicle in front, and the data can be used to generate driving sequences that can then be labeled for training a machine-learned model. As another example, driving data can be obtained from vehicles in a service fleet (e.g., a rideshare service), such as GPS data and image data, which can be analyzed and labeled to generate training data sets. Additionally, in some implementations, training data can be generated using driving data from simulations, such as driving simulations using a test track and/or simulated real world scenarios that are more difficult for an autonomous vehicle to handle.

As an example, in some implementations, ground truth label training data could be obtained from a labeling team (e.g., human labelers) reviewing various events/situations from driving logs and providing indications of a maximum speed (and/or a target offset from a nominal path) for time increments in each situation. For example, labelers can be provided with short snippets of driving activity (e.g., one minute driving data and video snippets) which the labelers can review and provide indications of speed a vehicle could comfortably travel in the situation. In some cases, the human labelers can ignore or screen out some information in the snippet when making determinations, such as a slower vehicle traveling in front, a traffic light, etc. The human labeler can provide a speed label for each time step of the snippet. In some cases, the human labeler can indicate that no caution is needed (e.g., the autonomous vehicle can drive at the posted speed limit) for a time step of the snippet. For example, when reviewing a snippet, the human labeler can indicate what speed a passenger may feel comfortable with the autonomous vehicle driving in a certain scenario. In some implementations, multiple labelers can review each sequence clip and determine appropriate speeds, such that the determinations can be averaged when generating the ground truth label data, for example, to reduce individual labeler biases.

In particular, in some implementations, generating labeled training data can include absolute value label extraction. For instance, a labeler can review a short log snippet (e.g., one minute snippet, etc.) that contains a speed context awareness situation/scenario. The log snippet can be divided into small increments of time (e.g., time steps) and the labeler can provide absolute speed and/or offset from nominal path as speed labels for each time increment. The labeler can be provided with the autonomous vehicles actual driving speed and nominal path offset in each region as reference points.

In some implementations, generating labeled training data can include a labeler feedback mechanism, such as smart playback (e.g., video playback speed modification). For instance, a labeler can review a short log snippet that contains a speed context awareness situation/scenario and provide speed labels for time increments within the snippet. To gain feedback on the speed label determinations, the labeler can be provided with playback of the log snippet at increased or reduced playback speeds based on the speed labels, for example, to simulate driving at the labeled speed. The labeler can then determine whether the playback speed lets the driving events proceed at an appropriate speed. For example, some situations mostly occur with respect to static or slow moving objects, and changing the playback rate can provide the illusion that the vehicle is moving at a different speed in the situation. As an example, if a front car is going 10 miles per hour and the labeler thinks 20 miles per hour could be appropriate for the scenario, the snippet could be played back at two times the speed for the labeler to judge whether the labeled speed is appropriate.

In some implementations, generating labeled training data can include reference matching. For instance, a labeler can review a short log snippet that contains a speed context awareness situation. The log snippet can be divided into small increments of time and the labeler can provide a discrete label for the situation at each time step. For example, a number of categories could be established (e.g., extremely cautious, moderately cautious, light caution, no caution). For each category, a labeler can be provided with reference videos of situations where a human driver drove through a number of example situations that highlight the situation type and appropriate speeds associated with each category. Additionally, or alternatively, a similar reference category scheme could be provided for use in determining nominal lane offset labels.

As another example, in some implementations, ground truth label training data could be obtained based on operator override data. For instance, an operator can provide speed modifications and/or in-lane shift modifications for the autonomous vehicle during operation. For example, the operator can set target values (e.g., speed target, offset target) in a particular situation and clear the target values when no longer wanted. The situations where these overrides are employed can be extracted from driving data logs, for example, by tracking override events and determining start and end times for the override in the driving data logs. These extracted override situations can be labeled and added to training data sets for use in training the machine-learned model(s). In some cases, the override events can be filtered to reduce improper/unnecessary uses of overrides (e.g., an operator using the modifications for reasons other than speed context awareness).

As another example, in some implementations, ground truth label training data could be obtained based on labeling of human driving data logs. For instance, in some implementations, driving data logs can be obtained from human drivers who have been instructed to drive optimally (e.g., as if a rider was in the vehicle). For example, human driven data logs can be obtained and checked for validity (e.g., driver operating vehicle as expected). Labeling can be applied to the logs to identify regions where the human driver is believed to be limiting the vehicle speed based on speed limit context awareness situations. For example, human driving data logs can be filtered to remove situations where driving speed was reduced for reasons other than a context awareness scenario. The labeled situations can be added to training data sets for use in training the machine-learned model(s). In some implementations, the labeling can include human driving logs generated from simulated driving scenarios, such as using a test track, in addition to real street environments.

As another example, ground truth label training data could be generated based on analysis of other driver behavior in the surrounding environment of the autonomous vehicle. For instance, sensors, such as lidar, radar, image capture devices, and/or the like, can capture data regarding the behavior of other vehicles around the autonomous vehicle in certain situations. The data can then be analyzed to extract context awareness scenarios which can be added to a training data set.

In some implementations, the vehicle computing system can determine a speed limit and/or a target offset from the nominal path for the autonomous vehicle. For instance, in some implementations, a model, such as a machine-learned model, can determine a speed limit for the autonomous vehicle based at least in part on the features (e.g., the autonomous vehicle features and the context features). Additionally, or alternatively, the machine-learned model can determine a target offset from the nominal path for the autonomous vehicle based at least in part on the features (e.g., the autonomous vehicle features and the context features). For example, the model output can indicate that based on the context of the autonomous vehicle, the autonomous vehicle should travel at a speed below the posted speed limit. For instance, based on a model output, an autonomous vehicle could slow down autonomously (e.g., without being overridden by an operator) in certain context scenarios, such as on busy streets with numerous pedestrians and/or parked vehicles. Additionally, or alternatively, the model output can indicate that based on the context of the autonomous vehicle, the autonomous vehicle should move over a defined amount in the current travel lane or change travel lanes.

In particular, the machine-learned model can output speed limit context decisions in various scenarios and thereby improve the safe driving behavior of the autonomous vehicle. For instance, the vehicle computing system can determine that scenarios such as a squeeze maneuver, an occlusion interaction, and/or a context interaction could require reducing the speed of the autonomous vehicle and/or implementing an offset from the nominal path of the autonomous vehicle.

As an example, a squeeze maneuver may require the autonomous vehicle to travel through a narrow region of free space created by other objects in the scene (e.g., other vehicles, pedestrians, etc.) and/or properties of the roadway. The vehicle computing system can determine that the autonomous vehicle speed should be limited as a function of the narrow region's size (e.g., the squeeze gap size). In addition, the vehicle's speed can be limited based in part on the type of objects (e.g., vehicles versus pedestrians) forming the boundary of the narrow region and their anticipated movements.

As another example, an occlusion interaction may require the autonomous vehicle to reduce speed and/or move over because it must travel in proximity to a region of space that is visibly occluded to the autonomous vehicle, for example, where a bus is stopped at a crosswalk. In such situations, as the autonomous vehicle approaches the occluded region, the crosswalk for example, it can be determined that the autonomous vehicle should reduce speed (and/or move over) to protect against unseen objects, such as a pedestrian entering the crosswalk. In another example, an occlusion interaction could require an autonomous vehicle to travel through a visibly occluded region at some point along the future path, such as when the vehicle is making a right hand turn but the lane of travel is blocked by a parked vehicle (e.g., a parked box truck) or when making a left turn at a stop sign where the area the vehicle is turning into is occluded by traffic stopped at the stop sign.

In another example, a context interaction may require the autonomous vehicle to travel though a complex region, such as regions with numerous pedestrians, traveling close to parked vehicles for a significant distance, and the like, where an appropriate vehicle response cannot be determined by an individual actor, occlusion, or gap in the region.

More particularly, in some embodiments, the model can provide a maximum speed limit value as output, which can be provided to other components of the vehicle computing system for use in motion planning. For example, the maximum speed limit value can be applied in a cost function of a motion planning system and provide a modified speed limit which should be applied in a future moment (e.g., one second in the future). The autonomous vehicle operation can be controlled (e.g., using one or more vehicle controls) such that the autonomous vehicle is at/under that speed limit at the future moment (e.g., in one second). Additionally, or alternatively, the vehicle computing system can predict a speed limit for one or more upcoming segments of the path based at least in part on the model output. In some implementations, one or more parameters may be used to control how quickly the speed limit change is applied by the autonomous vehicle, such as rules for limiting lateral jerk, lateral deceleration, and/or the like, for example.

In some implementations, vehicle-to-vehicle communication can be used to enhance the determination of a maximum speed limit, such as providing previews of upcoming route segments. For instance, a first vehicle can provide information on a current route segment the vehicle is traveling, to a routing system for example, and the routing system can provide information on that route segment to other vehicles that are approaching that route segment to use in determining maximum speed limit values and/or nominal path offset values. For example, in some cases, the receiving autonomous vehicle may use the information to determine appropriate speed limits for the segment, determine that a lane change is appropriate for the segment, or even, determine that an alternate route should be selected.

The systems and methods described herein can provide a number of technical effects and benefits. For instance, the vehicle computing system can locally (e.g., on board the autonomous vehicle) detect the surrounding context of the autonomous vehicle, evaluate the features (e.g., context features and autonomous vehicle state features) relative to one or more context regions, and adjust the speed and/or lane position of the autonomous vehicle accordingly. By performing such operations onboard the autonomous vehicle, the vehicle computing system can avoid latency issues that arise from communicating with a remote computing system. The vehicle computing system can be configured to continuously perform an iterative speed optimization process as the autonomous vehicle travels through different regions along the nominal path. As such, the vehicle computing system can proactively control the speed of the autonomous vehicle to reduce sudden changes and to achieve improved driving safety.

The systems and methods described herein can also provide resulting improvements to vehicle computing technology tasked with operation of an autonomous vehicle. For example, aspects of the present disclosure can enable a vehicle computing system to more efficiently and accurately control an autonomous vehicle's motion by allowing for smoother adjustment of travel speeds based on the analysis of context features along a nominal path. Additionally, the systems and methods described herein provide for lower computational cost and complexity than other potential solutions, for example, where it may be necessary to generate predictions for every object in a scene, even if an interaction with an object has a low likelihood of occurring.

With reference to the figures, example embodiments of the present disclosure will be discussed in further detail. FIG. 1 depicts a block diagram of an example system 100 for controlling the navigation of a vehicle 102 according to example embodiments of the present disclosure. The autonomous vehicle 102 is capable of sensing its environment and navigating with little to no human input. The autonomous vehicle 102 can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle 102 can be configured to operate in one or more modes, for example, a fully autonomous operational mode and/or a semi-autonomous operational mode. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle.

The autonomous vehicle 102 can include one or more sensors 104, a vehicle computing system 106, and one or more vehicle controls 108. The vehicle computing system 106 can assist in controlling the autonomous vehicle 102. In particular, the vehicle computing system 106 can receive sensor data from the one or more sensors 104, attempt to comprehend the surrounding environment by performing various processing techniques on data collected by the sensors 104, and generate an appropriate motion path through such surrounding environment. The vehicle computing system 106 can control the one or more vehicle controls 108 to operate the autonomous vehicle 102 according to the motion path.

The vehicle computing system 106 can include one or more processors 130 and at least one memory 132. The one or more processors 130 can be any suitable processing device (e.g., a processor core, a microprocessor, an ASIC, a FPGA, a controller, a microcontroller, etc.) and can be one processor or a plurality of processors that are operatively connected. The memory 132 can include one or more non-transitory computer-readable storage mediums, such as RAM, ROM, EEPROM, EPROM, flash memory devices, magnetic disks, etc., and combinations thereof. The memory 132 can store data 134 and instructions 136 which are executed by the processor 130 to cause vehicle computing system 106 to perform operations. In some implementations, the one or more processors 130 and at least one memory 132 may be comprised in one or more computing devices, such as computing device(s) 129, within the vehicle computing system 106.

In some implementations, vehicle computing system 106 can further be connected to, or include, a positioning system 120. Positioning system 120 can determine a current geographic location of the autonomous vehicle 102. The positioning system 120 can be any device or circuitry for analyzing the position of the autonomous vehicle 102. For example, the positioning system 120 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position. The position of the autonomous vehicle 102 can be used by various systems of the vehicle computing system 106.

As illustrated in FIG. 1, in some embodiments, the vehicle computing system 106 can include a perception system 110, a prediction system 112, and a motion planning system 114 that cooperate to perceive the surrounding environment of the autonomous vehicle 102 and determine a motion plan for controlling the motion of the autonomous vehicle 102 accordingly. In some implementations, the vehicle computing system 106 can also include a feature extractor/concatenator 122 and a speed limit context awareness machine-learned model 124 that can be provide data to assist in determining the motion plan for controlling the motion of the autonomous vehicle 102.

In particular, in some implementations, the perception system 110 can receive sensor data from the one or more sensors 104 that are coupled to or otherwise included within the autonomous vehicle 102. As examples, the one or more sensors 104 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 102.

As one example, for LIDAR system, the sensor data can include the location (e.g., in three-dimensional space relative to the LIDAR system) of a number of points that correspond to objects that have reflected a ranging laser. For example, LIDAR system can measure distances by measuring the Time of Flight (TOF) that it takes a short laser pulse to travel from the sensor to an object and back, calculating the distance from the known speed of light.

As another example, for RADAR system, the sensor data can include the location (e.g., in three-dimensional space relative to RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

Thus, the one or more sensors 104 can be used to collect sensor data that includes information that describes the location (e.g., in three-dimensional space relative to the autonomous vehicle 102) of points that correspond to objects within the surrounding environment of the autonomous vehicle 102.

In addition to the sensor data, the perception system 110 can retrieve or otherwise obtain map data 118 that provides detailed information about the surrounding environment of the autonomous vehicle 102. The map data 118 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 106 in comprehending and perceiving its surrounding environment and its relationship thereto.

The perception system 110 can identify one or more objects that are proximate to the autonomous vehicle 102 based on sensor data received from the one or more sensors 104 and/or the map data 118. In particular, in some implementations, the perception system 110 can determine, for each object, state data that describes a current state of such object. As examples, the state data for each object can describe an estimate of the object's: current location (also referred to as position); current speed; current heading (also referred to together as velocity); current acceleration; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 110 can determine state data for each object over a number of iterations. In particular, the perception system 110 can update the state data for each object at each iteration. Thus, the perception system 110 can detect and track objects (e.g., vehicles, pedestrians, bicycles, and the like) that are proximate to the autonomous vehicle 102 over time.

The prediction system 112 can receive the state data from the perception system 110 and predict one or more future locations for each object based on such state data. For example, the prediction system 112 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 114 can determine a motion plan for the autonomous vehicle 102 based at least in part on the predicted one or more future locations for the object provided by the prediction system 112 and/or the state data for the object provided by the perception system 110. Stated differently, given information about the current locations of objects and/or predicted future locations of proximate objects, the motion planning system 114 can determine a motion plan for the autonomous vehicle 102 that best navigates the autonomous vehicle 102 relative to the objects at such locations.

As one example, in some implementations, the motion planning system 114 can determine a cost function for each of one or more candidate motion plans for the autonomous vehicle 102 based at least in part on the current locations and/or predicted future locations of the objects. For example, the cost function can describe a cost (e.g., over time) of adhering to a particular candidate motion plan. For example, the cost described by a cost function can increase when the autonomous vehicle 102 approaches a possible impact with another object and/or deviates from a preferred pathway (e.g., a preapproved pathway).

Thus, given information about the current locations and/or predicted future locations of objects, the motion planning system 114 can determine a cost of adhering to a particular candidate pathway. The motion planning system 114 can select or determine a motion plan for the autonomous vehicle 102 based at least in part on the cost function(s). For example, the candidate motion plan that minimizes the cost function can be selected or otherwise determined. The motion planning system 114 can provide the selected motion plan to a vehicle controller 116 that controls one or more vehicle controls 108 (e.g., actuators or other devices that control gas flow, acceleration, steering, braking, etc.) to execute the selected motion plan.

In some implementations, the vehicle computing system 106 can include a feature extractor/concatenator 122. The feature extractor/concatenator 122 can extract features regarding the autonomous vehicle state and the surrounding environment of the autonomous vehicle for use in enabling speed limit context awareness in the motion planning. The feature extractor/concatenator 122 can receive feature data (e.g., features relative to objects in a context region around the nominal path and/or features that are relative to the vehicle current position), for example, from the perception system 110, the prediction system 112, and/or the motion planning system 114, based at least in part on the object state data, map data, and/or the like. The feature extractor/concatenator 122 can divide a portion of the nominal path of an autonomous vehicle into a plurality of regions (e.g., n bins of x length) and compute statistics and features (e.g., associated with pedestrians, vehicles, road boundaries, etc.) inside each region/bin. Additionally, the feature extractor/concatenator 122 can determine features associated with the autonomous vehicle position/state, which may appear a single time within a current scene and not be divided among the bins. The feature extractor/concatenator 122 can concatenate the plurality of feature data into a feature vector for use as input to a machine-learned model.

In some implementations, the vehicle computing system 106 can include a speed limit context awareness machine-learned model 124. The context awareness machine-learned model 124 can provide speed limit context awareness predictions, based on features regarding the autonomous vehicle state and the surrounding environment of the autonomous vehicle, that can be provided to the motion planning system 114 for use in determining/adjusting a motion plan for the autonomous vehicle 102. For example, the context awareness machine-learned model 124 can receive a feature vector as input, for example, from the feature extractor/concatenator 122. The context awareness machine-learned model 124 can predict a maximum speed limit value to be applied for the autonomous vehicle 102 at a future moment while traveling the nominal path. Additionally or alternatively, the context awareness machine-learned model 124 can predict a speed limit to be applied for each segment of the path ahead of the autonomous vehicle 102. Additionally or alternatively, the context awareness machine-learned model 124 can predict a target offset from the nominal path.

In some implementations, the feature extractor/concatenator 122 and/or the context awareness machine-learned model 124 may be included as part of the motion planning system 114 or another system within the vehicle computing system 106.

Each of the perception system 110, the prediction system 112, the motion planning system 114, the vehicle controller 116, the feature extractor/concatenator 122, and the speed limit context awareness machine-learned model 124 can include computer logic utilized to provide desired functionality. In some implementations, each of the perception system 110, the prediction system 112, the motion planning system 114, the vehicle controller 116, the feature extractor/concatenator 122, and the speed limit context awareness machine-learned model 124 can be implemented in hardware, firmware, and/or software controlling a general purpose processor. For example, in some implementations, each of the perception system 110, the prediction system 112, the motion planning system 114, the vehicle controller 116, the feature extractor/concatenator 122, and the speed limit context awareness machine-learned model 124 includes program files stored on a storage device, loaded into a memory, and executed by one or more processors. In other implementations, each of the perception system 110, the prediction system 112, the motion planning system 114, the vehicle controller 116, the feature extractor/concatenator 122, and the speed limit context awareness machine-learned model 124 includes one or more sets of computer-executable instructions that are stored in a tangible computer-readable storage medium such as RAM hard disk or optical or magnetic media.

Figure 2:
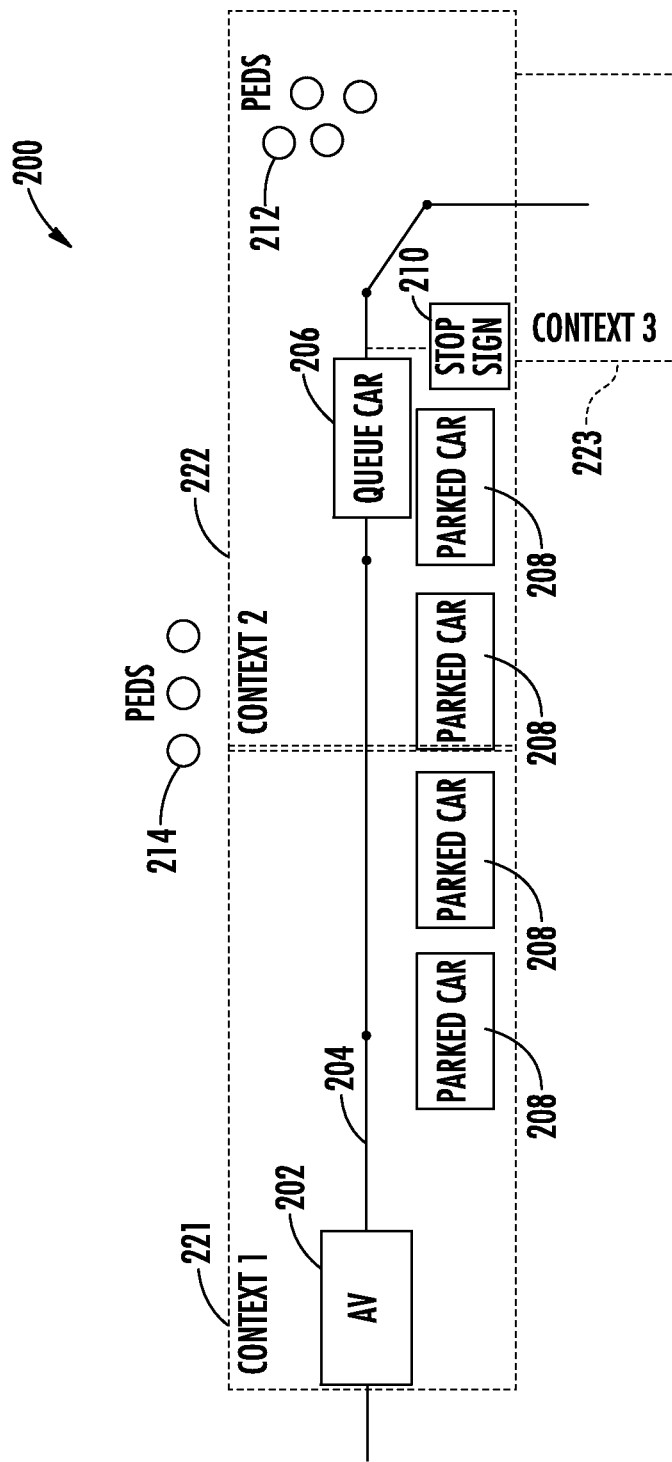
FIG. 2 depicts an example of autonomous vehicle environment around a nominal path according to example embodiments of the present disclosure.

FIG. 2 depicts an example autonomous vehicle environment 200 around a nominal path according to example embodiments of the present disclosure.

As described herein, an autonomous vehicle can include one or more computing devices and various subsystems that can cooperate to perceive the surrounding environment of the autonomous vehicle and determine a motion plan for controlling the motion of the autonomous vehicle. As illustrated in FIG. 2, an autonomous vehicle environment 200 may include a plurality of objects and/or roadway features along a nominal path 204 of an autonomous vehicle 202. The autonomous vehicle 202 may detect and/or classify a plurality of objects along/around the nominal path 204, for example, one or more queue objects along the nominal path (e.g., queue vehicle 206 ahead of the autonomous vehicle 202), one or more other vehicles around the nominal path, (e.g., stationary vehicles 208), one or more traffic control devices (e.g., stop sign 210), and/or one or more pedestrians (e.g., pedestrians 212 and pedestrians 214). The systems and methods of the present disclosure can obtain information regarding the context around the autonomous vehicle, including a plurality of features associated with the autonomous vehicle context. For example, such features can include features regarding aggregate information about objects in a context region around the nominal path (e.g., pedestrians, vehicles, path boundaries, and/or the like) and/or features that are relative to the vehicle current position (e.g., posted speed limit, distances to traffic control devices, distances to other queued objects, and/or the like).

In some implementations, the autonomous vehicle surrounding environment 200 (e.g., a nominal path for the autonomous vehicle and a certain radius surrounding the vehicle and the path) can be divided into a series of segments or bins (e.g., n bins of x length). As illustrated in FIG. 2, the environment 200 along nominal path 204 can be divided into context bins of a defined length, such as context 221, context 222, and context 223, for example. Each bin, for example, context 221, context 222, and context 223, can be used to group together information about features including objects (e.g., pedestrians, vehicles, and/or the like), path properties (e.g., nominal path geometrical properties), road boundaries (e.g., distances to road/lane boundaries, etc.), and/or the like.

In particular, the autonomous vehicle 202 (e.g., the vehicle computing system) can identify features located inside each bin and compute statistics and features inside each bin. As an example, as illustrated in FIG. 2, the autonomous vehicle 202 can divide a portion of the nominal path 204 into a plurality of bins, context 221, context 222, and context 223. The autonomous vehicle 202 can identify that a first bin, context 221, includes two stationary vehicles 208. The autonomous vehicle 202 can identify that a second bin, context 222, includes a queued vehicle 206, two stationary vehicles 208, and four pedestrians 212. In addition, the autonomous vehicle 202 may determine that some detected objects are outside a certain radius surrounding the vehicle 202 and the path 204, for example, pedestrians 214, and as such, not include those objects may not be included within a bin and may not be considered in a speed limit context awareness analysis.

The autonomous vehicle 202 can compute features and statistics for these objects in each bin, as well as roadway properties in each bin, such as average distance to pedestrians on the left/right, speed of closest pedestrian on the left/right, distance to nominal path of the closest pedestrian on the left/right, distribution of pedestrians to the left/right of the nominal path, average distance to other vehicles on the left/right, speed of closest other vehicle on the left/right, distance to nominal path of the closest other vehicle on the left/right, distribution of other vehicles to the left/right of the nominal path, maximum curvature along nominal path in context region, closest distance between road boundary to the left and the autonomous vehicle in context region and average distance to the left, closest distance between road boundary to the right and the autonomous vehicle in context region and average distance to the right, and/or the like, for example.

Additionally, the autonomous vehicle 202 can determine autonomous vehicle features that may occur once within the scene such as a posted speed limit, distance to traffic control device, distance from nose of the autonomous vehicle to a closest queue object along the nominal path, speed of the closest queue object, acceleration of the closest queue object, and/or the like. For example, the autonomous vehicle 202 may determine autonomous vehicle features relative to the queued vehicle 206 and/or stop sign 210 within the autonomous vehicle environment 200.

FIG. 3A-3C, FIG. 4A-4B, and FIG. 5 illustrate some example scenarios where operation of the autonomous vehicle at a posted speed limit along a nominal path may not be feasible and/or desirable based on the context around the autonomous vehicle, such that the systems and methods of the present disclosure may determine a speed limit for the autonomous vehicle below the posted speed limit.

Figures 3A, 3B:
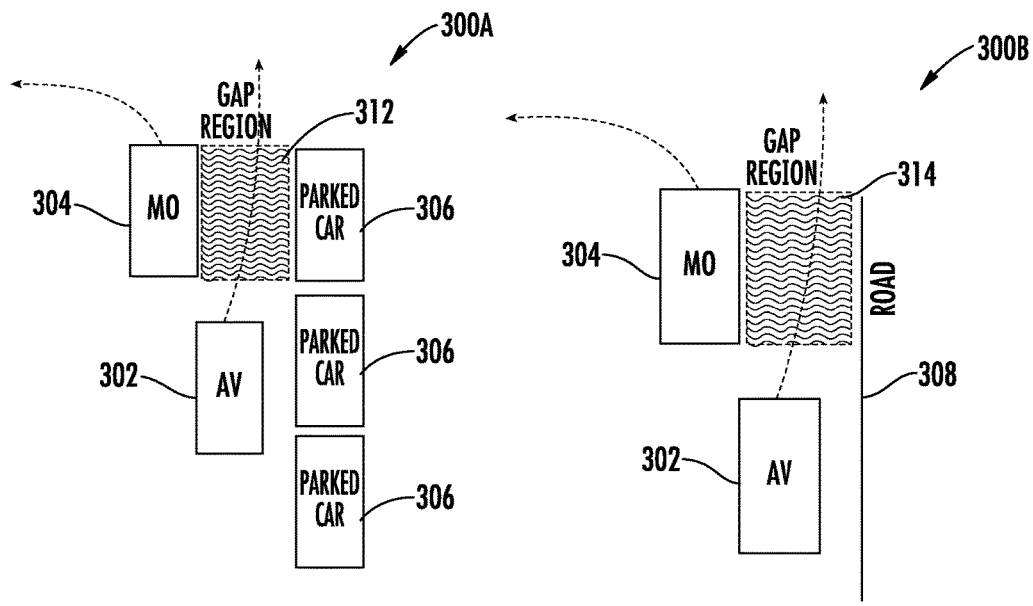
FIG. 3A-3C depict examples of autonomous vehicle narrow region scenarios according to example embodiments of the present disclosure.
Figure 3C:
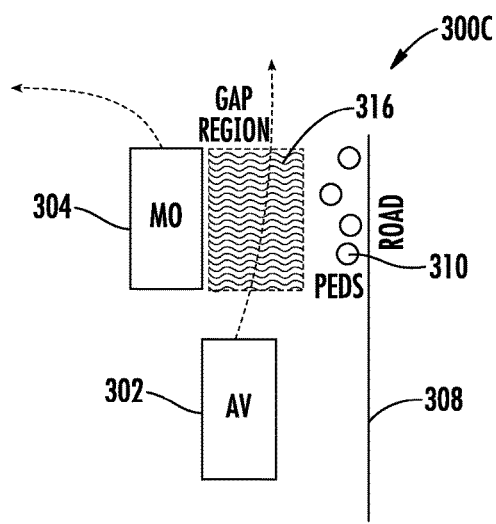

As one example, an autonomous vehicle may be required to travel through a narrow region of the nominal path (e.g., a squeeze maneuver) due to objects in or around the nominal path and/or properties of the nominal path, and therefore, it may be desirable for the autonomous vehicle to travel through the narrow region at a reduced speed. FIG. 3A through FIG. 3C depict example autonomous vehicle narrow region scenarios 300A, 300B, and 300C according to example embodiments of the present disclosure.

As illustrated in FIG. 3A in context scenario 300A, the nominal path of an autonomous vehicle 302 may require the autonomous vehicle 302 to travel through a narrow region of free space, e.g., gap region 312, created by other objects in the scene, such as moving object 304 (e.g., a moving vehicle) and one or more stationary vehicles 306. The autonomous vehicle 302 (e.g., via a vehicle computing system) can determine that the autonomous vehicle speed should be limited as a function of the gap region 312's size. In addition, the autonomous vehicle's speed can be limited based in part on the type of objects (e.g., moving vehicle 304 and parked vehicles 306) forming the boundary of the gap region 312 and their anticipated movements.

As illustrated in FIG. 3B in context scenario 300B, the nominal path of an autonomous vehicle 302 may require the autonomous vehicle 302 to travel through a narrow region of free space, e.g., gap region 314, created by a moving vehicle 304 and a road boundary 308 (e.g. a roadway curb, etc.). The autonomous vehicle 302 (e.g., via a vehicle computing system) can determine that the autonomous vehicle speed should be limited as a function of the gap region 314's size as well as the type of objects (e.g. vehicle 304 and boundary 308) forming the gap region 314.

As illustrated in FIG. 3C in context scenario 300C, the nominal path of an autonomous vehicle 302 may require the autonomous vehicle 302 to travel through a narrow region of free space, e.g., gap region 316, created by a moving vehicle 304 and a plurality of pedestrians 310 near the road boundary 308. The autonomous vehicle 302 (e.g., via a vehicle computing system) can determine that the autonomous vehicle speed should be limited as a function of the gap region 316's size as well as the type of objects (e.g. vehicle 304 and pedestrians 310) forming the gap region 316. For example, in scenario 300C, since gap region 316 is bounded by a plurality of pedestrians 310, the autonomous vehicle 302 can determine that the vehicle speed should be reduced further in scenario 300C than in scenarios 300A and 300B where the gap region boundaries are other vehicles and/or roadway boundaries.

Figure 4A:
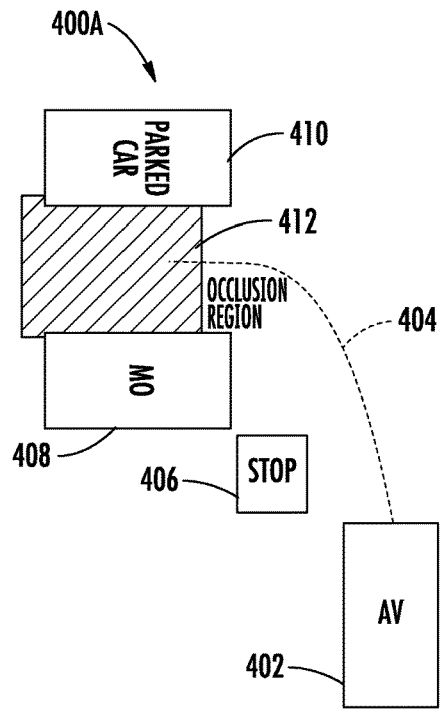
FIG. 4A-4B depict examples of autonomous vehicle occluded region scenarios according to example embodiments of the present disclosure.
Figure 4B:
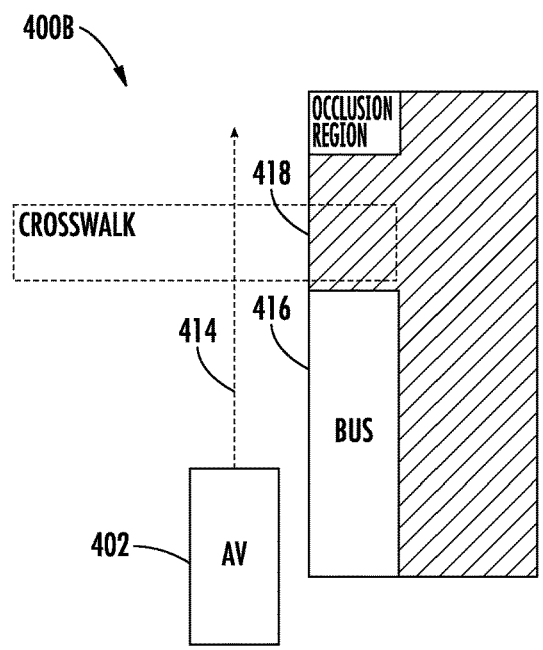

As another example, some regions of a nominal path may include one or more occlusions (e.g., parked vehicles, large vehicles, buildings, signs, etc.) that limit the visibility within the region and therefore, it may be desirable for the autonomous vehicle to travel through the region that is visibly occluded at a reduced speed. FIG. 4A and FIG. 4B depict example autonomous vehicle occluded region scenarios 400A and 400B according to example embodiments of the present disclosure.

As illustrated in FIG. 4A in context scenario 400A, a nominal path, such as nominal path 404, of an autonomous vehicle 402 may require the autonomous vehicle 402 to travel through an occluded region, such as occluded region 412. For example, when an autonomous vehicle 402 approaches a traffic control device, such as stop sign 406, and the nominal path 404 requires a left turn, an occluded region 412 can occur as a result of other vehicles, such as vehicle 408, stopped for the stop sign 406. For instance, as illustrated in FIG. 4A, occluded region 412, located between parked car 410 and stopped vehicle 408 along the nominal path 404, occurs due to vehicle 408 being stopped at stop sign 406, thus reducing visibility for autonomous vehicle 402 along the nominal path following the left turn, which in turn may necessitate reducing the travel speed of autonomous vehicle 402.

Additionally, as illustrated in FIG. 4B in context scenario 400B, a nominal path, such as nominal path 414, of an autonomous vehicle 402 may require the autonomous vehicle 402 to travel along an occluded region, such as occluded region 418, where visibility of objects approaching the nominal path may be limited. For example, autonomous vehicle 402 may be approaching an intersection, crosswalk, or the like on a nominal path 414 and may have to pass a large vehicle, such as bus 416. As illustrated, due to the location of bus 416, which may be stopped at a bus stop with passengers unloading, for example, the autonomous vehicle may have reduced visibility of potential objects (e.g., pedestrians) in an occluded region 418. For instance, one or more pedestrians may be preparing to enter the crosswalk from occluded region 418 and may not be visible to the autonomous vehicle 402, which may suggest that the travel speed of autonomous vehicle be reduced to avoid a potential interaction with an unseen object (e.g., a pedestrian).

Figure 5:
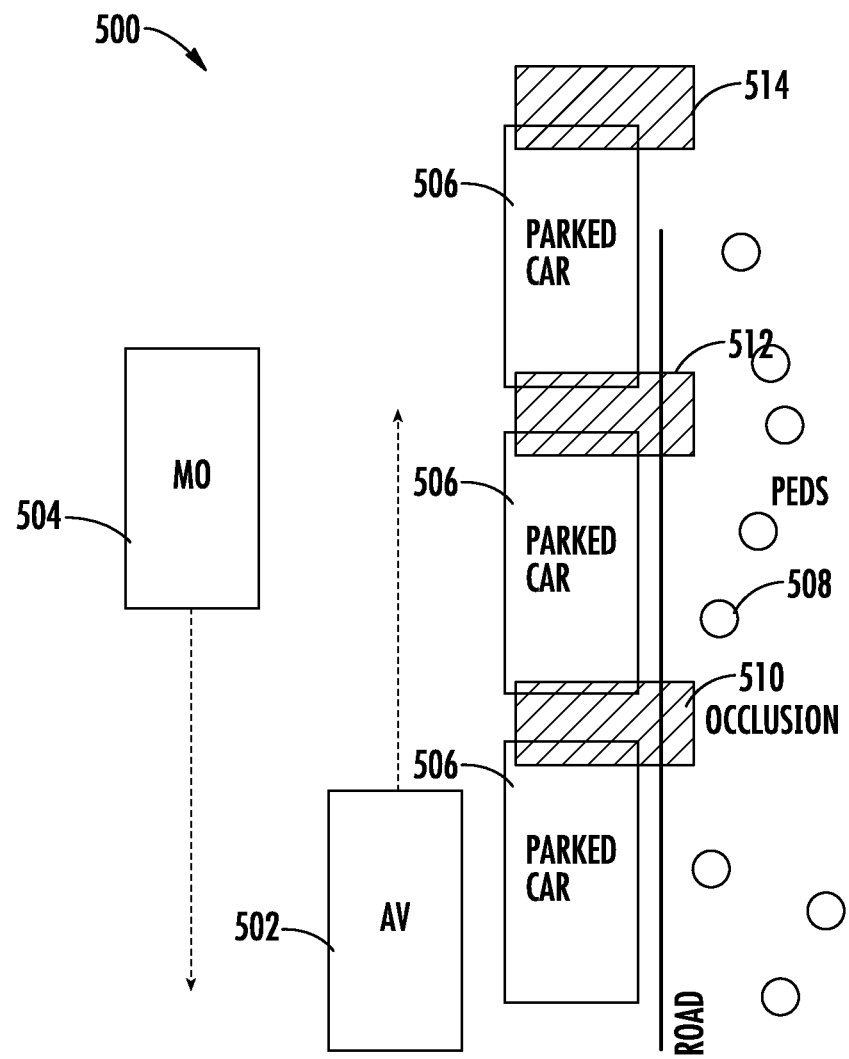
FIG. 5 depicts an example of an autonomous vehicle context scenario according to example embodiments of the present disclosure.

FIG. 5 depicts an example of an autonomous vehicle complex context scenario 500 according to example embodiments of the present disclosure. As illustrated in FIG. 5 by context scenario 500, a nominal path of an autonomous vehicle 502 may require the autonomous vehicle 502 to travel through complex regions, such as a busy street where there may be narrower travel lanes, numerous parked vehicles 506, pedestrians 508, other moving vehicles 504, and/or the like, for example. For instance, as illustrated in FIG. 5, autonomous vehicle 502 may travel a nominal path 503 between another vehicle 504 and a number of parked vehicles 506. A number of occluded regions, such as occluded regions 510, 512, and 514 may occur along the nominal path 503 as a result of the parked vehicles 506. In addition, a number of pedestrians, such as pedestrians 508, may be traveling near or approaching the nominal path 503 and may not be visible to the autonomous vehicle 502 due to the occluded regions. For example, a pedestrian 508 could be approaching the nominal path 503 by moving between parked vehicles 506 in occluded region 512, such as to return to a parked vehicle, and the pedestrian may not be visible due to the occlusion, and thus it may be desirable to reduce the vehicle travel speed to allow for an appropriate response time to such an unseen object.

Figure 6:
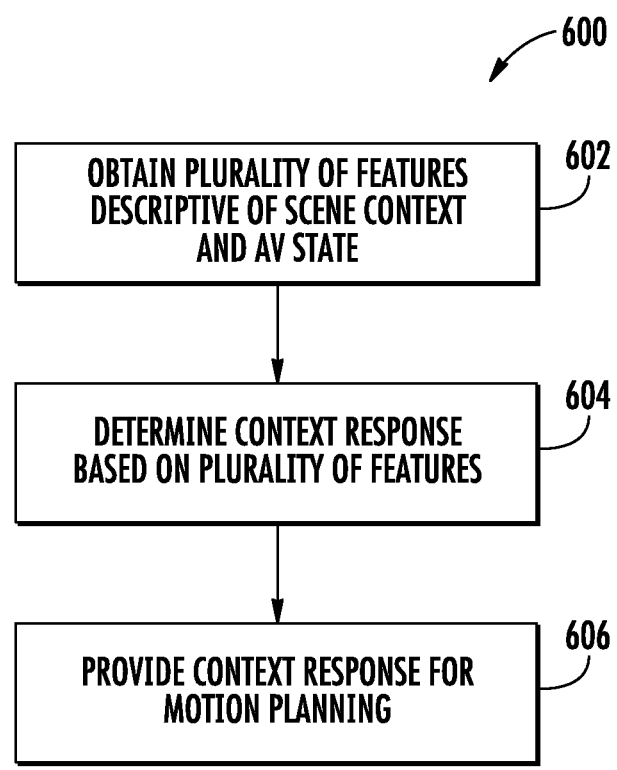
FIG. 6 depicts a flowchart diagram of example operations for speed limit context awareness according to example embodiments of the present disclosure.

FIG. 6 depicts a flowchart diagram of example operations 600 for providing speed limit context awareness during operation of an autonomous vehicle according to example embodiments of the present disclosure. One or more portion(s) of the operations 600 can be implemented by one or more computing devices such as, for example, the vehicle computing system 106 of FIG. 1, the computing system 1102 of FIG. 11, the computing system 1130 of FIG. 11, or the like. Moreover, one or more portion(s) of the operations 600 can be implemented as an algorithm on the hardware components of the device(s) described herein (e.g., as in FIGS. 1 and 11) to, for example, provide speed limit context awareness during autonomous vehicle operation.

At 602, one or more computing devices included within a computing system can obtain a plurality of features for a scene along the nominal path of an autonomous vehicle. For instance, a computing system (e.g., an autonomous vehicle computing system) can obtain information, such as sensor and/or map data, regarding the context around the autonomous vehicle and determine a plurality of features associated with the autonomous vehicle context. For example, the computing system can obtain features regarding aggregate information about objects in a context region around the nominal path of the vehicle (e.g., pedestrians, vehicles, path boundaries, and/or the like) and/or features that are relative to the vehicle current position (e.g., posted speed limit, distances to traffic control devices, distances to other queued objects, and/or the like).

At 604, the computing system can determine a context response for the autonomous vehicle based on the plurality of features (e.g., context features and autonomous vehicle features in a current scene). In some implementations, the context response can at least include a derived speed constraint for the autonomous vehicle. For instance, in some implementations, a machine-learned model can determine a predicted maximum speed limit for the autonomous vehicle, to be provided as part of the context response, based at least in part on a feature vector (e.g., a concatenation of the autonomous vehicle features and the context features). Additionally or alternatively, the machine-learned model could determine a prediction of a target offset from the nominal path for the autonomous vehicle, to be provided as part of the context response, based at least in part on a feature vector. For example, the context response can indicate that based on the context of the autonomous vehicle, the autonomous vehicle should travel at a speed below the posted speed limit, and for example, provide a maximum speed limit to be applied one second in the future, and/or indicate that the autonomous vehicle should adjust its lane position and, for example, provide a target offset from the nominal path to be applied one second in the future.

At 606, the computing system can provide the context response, including, for example, a derived speed constraint (e.g., a maximum speed limit constraint for the autonomous vehicle) for use in determining a motion plan for the autonomous vehicle, for example, by the motion planning system 114. For instance, based on context response data, an autonomous vehicle motion plan could slow down the vehicle and/or adjust the autonomous vehicle lane position autonomously (e.g., without being overridden by an operator) in certain context scenarios, such as on busy streets with numerous pedestrians and/or parked vehicles.

Figure 7:
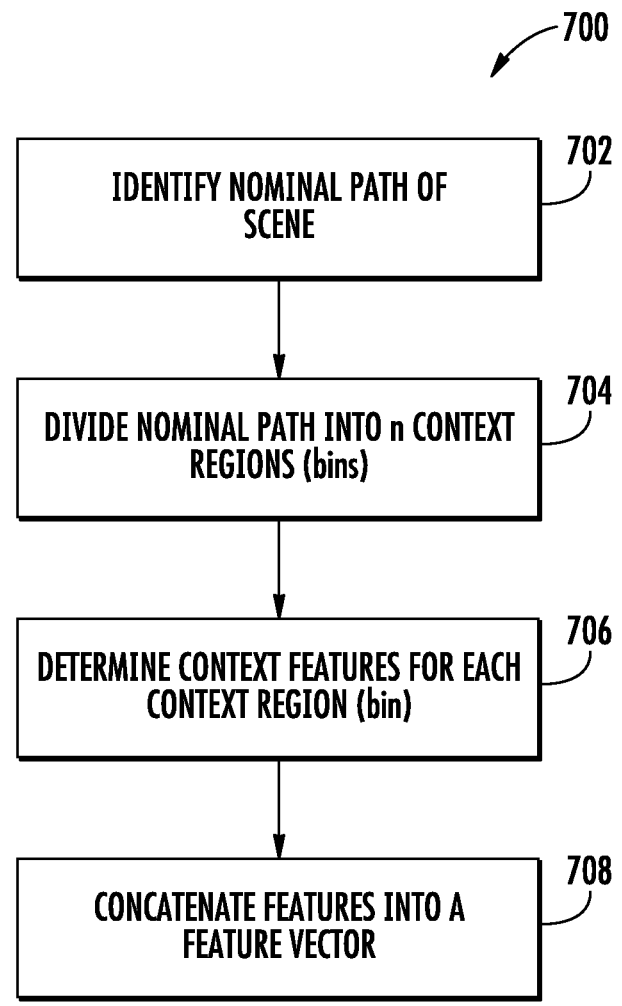
FIG. 7 depicts a flowchart diagram of example operations for speed limit context awareness according to example embodiments of the present disclosure.

FIG. 7 depicts a flowchart diagram of example operations 700 for providing speed limit context awareness during operation of an autonomous vehicle according to example embodiments of the present disclosure. One or more portion(s) of the operations 700 can be implemented by one or more computing devices such as, for example, the vehicle computing system 106 of FIG. 1, the computing system 1102 of FIG. 11, the computing system 1130 of FIG. 11, or the like. Moreover, one or more portion(s) of the operations 700 can be implemented as an algorithm on the hardware components of the device(s) described herein (e.g., as in FIGS. 1 and 11) to, for example, provide speed limit context awareness during autonomous vehicle operation.

At 702, one or more computing devices included within a computing system can obtain a portion of a nominal path of an autonomous vehicle, for example, the portion of the nominal path within a current scene of the autonomous vehicle, such as nominal path 204 illustrated in FIG. 2.

At 704, the computing system can divide the portion of the nominal path into a plurality of bins or segments. For instance, the surrounding environment of the autonomous vehicle (e.g., a nominal path for the autonomous vehicle and a certain radius surrounding the vehicle and the path) can be divided into a series of segments or bins. For example, the nominal path of the autonomous vehicle can be divided into a plurality of defined length segments, such as 10 meters, 15 meters, etc., with each segment being a context region for speed limit context awareness.

At 706, the computing system can compute context features inside each bin/segment of the nominal path. For instance, each segment or bin can be used to group together information about features including objects (e.g., pedestrians, vehicles, etc.), path properties (e.g., nominal path geometrical properties), road boundaries (e.g., distances to road/lane boundaries, etc.), and/or the like. The computing system can compute aggregate features and statistics of the objects within each bin. The computing system can also determine a closest pedestrian and a closest vehicle to the autonomous vehicle within a region (e.g., inside a bin), for example. Additionally, the computing system can determine one or more autonomous vehicle features associated with the current position of the autonomous vehicle that are not particular to a single bin.

At 708, the computing system can concatenate the plurality of features, for example, context features and the autonomous vehicle features as described herein, into a feature vector which can be provided as input to a machine-learned model. For example, the computing system can concatenate the plurality of features (e.g., context features and autonomous vehicle features) into one feature vector for use as input to a machine-learned model to provide speed limit context awareness for the autonomous vehicle. For example, the computing system can generate a feature vector of cat(autonomous_vehicle_features, context_features_region_1, context_features_region_2 . . . context_features_region_n). The feature vector can then be provided as input to a machine-learned model.

Figure 8A:
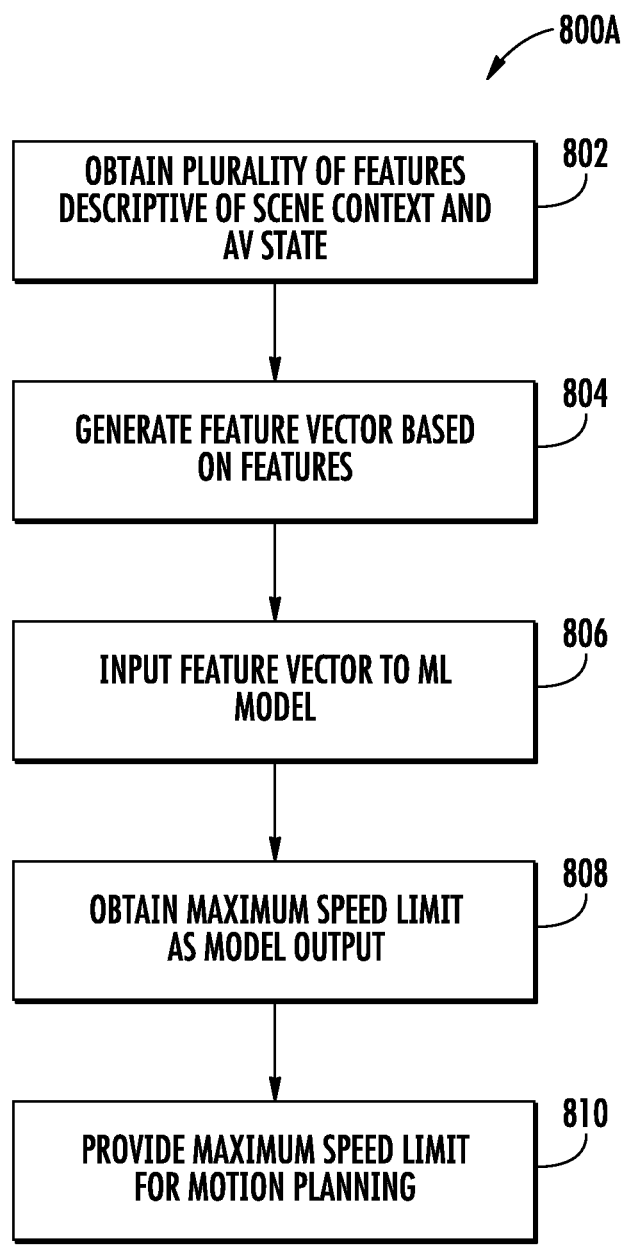
FIGS. 8A-8B depict flowchart diagrams of example operations for speed limit context awareness according to example embodiments of the present disclosure.

FIG. 8A depicts a flowchart diagram of example operations 800A for providing speed limit context awareness during operation of an autonomous vehicle according to example embodiments of the present disclosure. One or more portion(s) of the operations 800A can be implemented by one or more computing devices such as, for example, the vehicle computing system 106 of FIG. 1, the computing system 1102 of FIG. 11, the computing system 1130 of FIG. 11, or the like. Moreover, one or more portion(s) of the operations 800A can be implemented as an algorithm on the hardware components of the device(s) described herein (e.g., as in FIGS. 1 and 11) to, for example, provide speed limit context awareness during autonomous vehicle operation.

At 802, one or more computing devices included within a computing system can obtain a plurality of features for a scene along the nominal path of an autonomous vehicle. For instance, a computing system (e.g., an autonomous vehicle computing system) can obtain information, such as sensor and/or map data, regarding the context around the autonomous vehicle and determine a plurality of features associated with the autonomous vehicle context. For example, the computing system can obtain features regarding aggregate information about objects in a context region around the nominal path of the vehicle (e.g., pedestrians, vehicles, path boundaries, and/or the like) and/or features that are relative to the vehicle current position (e.g., posted speed limit, distances to traffic control devices, distances to other queued objects, and/or the like).

At 804, the computing system can generate a feature vector based on the plurality of features. For instance, the computing system can concatenate the plurality of obtained features (e.g., context features and autonomous vehicle features) into one feature vector for use as input to a machine-learned model to provide speed limit context awareness for the autonomous vehicle. For example, the computing system can generate a feature vector of cat (autonomous_vehicle_features, context_features_region_1, context_features_region_2 . . . context_features_region_n).

At 806, the computing system can provide the feature vector as input to a trained machine-learned model (e.g., a machine-learned model that has been trained to determine driving speed predictions for regions of the vehicle's nominal path based at least in part on the obtained features) to be used in generating machine-learned model output data for providing speed limit context awareness. A machine-learned model into which a feature vector can be provided as input at 806 can correspond, for example, to a machine-learned model 124 of FIG. 1, machine-learned model 1110 of FIG. 11, and/or machine-learned model 1140 of FIG. 11.

At 808, the computing system can receive maximum speed limit data (e.g., a predication of a maximum speed limit for the autonomous vehicle) as an output of the machine-learned model. For instance, in some implementations, a machine-learned model can determine a speed limit for the autonomous vehicle based at least in part on the feature vector (e.g., the autonomous vehicle features and the context features). For example, the model output can indicate that based on the context of the autonomous vehicle, the autonomous vehicle should travel at a speed below the posted speed limit, and, for example, provide a maximum speed limit (e.g., driving speed constraint) to be applied one second in the future.

At 810, the computing system can provide the maximum speed limit data for use in determining a motion plan for the autonomous vehicle, for example, by the motion planning system 114. For instance, based on a model output, an autonomous vehicle motion plan could slow down the vehicle autonomously (e.g., without being overridden by an operator) in certain context scenarios, such as on busy streets with numerous pedestrians and/or parked vehicles.

Figure 8B:
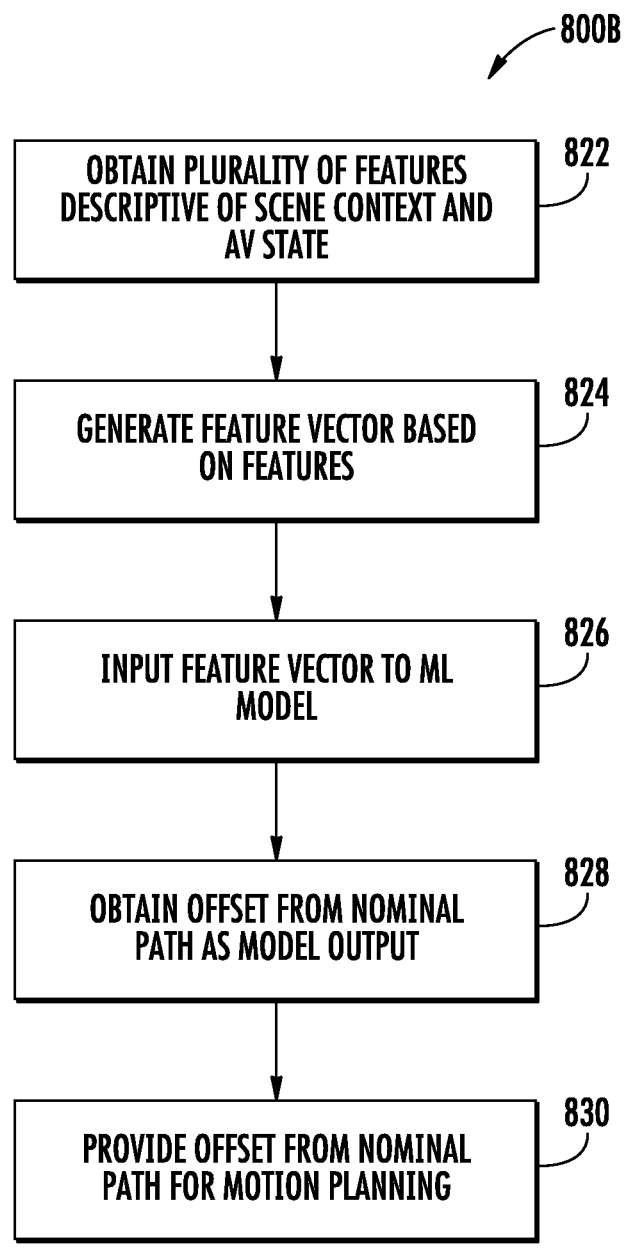

FIG. 8B depicts a flowchart diagram of example operations 800B for providing speed limit context awareness during operation of an autonomous vehicle according to example embodiments of the present disclosure. One or more portion(s) of the operations 800B can be implemented by one or more computing devices such as, for example, the vehicle computing system 106 of FIG. 1, the computing system 1102 of FIG. 11, the computing system 1130 of FIG. 11, or the like. Moreover, one or more portion(s) of the operations 800B can be implemented as an algorithm on the hardware components of the device(s) described herein (e.g., as in FIGS. 1 and 11) to, for example, provide speed limit context awareness during autonomous vehicle operation.

At 822, one or more computing devices included within a computing system can obtain a plurality of features for a scene along the nominal path of an autonomous vehicle. For instance, a computing system (e.g., an autonomous vehicle computing system) can obtain information, such as sensor and/or map data, regarding the context around the autonomous vehicle and determine a plurality of features associated with the autonomous vehicle context. For example, the computing system can obtain features regarding aggregate information about objects in a context region around the nominal path of the vehicle (e.g., pedestrians, vehicles, path boundaries, and/or the like) and/or features that are relative to the vehicle current position (e.g., posted speed limit, distances to traffic control devices, distances to other queued objects, and/or the like).

At 824, the computing system can generate a feature vector based on the plurality of features. For instance, the computing system can concatenate the plurality of obtained features (e.g., context features and autonomous vehicle features) into one feature vector for use as input to a machine-learned model to provide speed limit context awareness for the autonomous vehicle. For example, the computing system can generate a feature vector of cat (autonomous_vehicle_features, context_features_region_1, context_features_region_2 . . . context_features_region_n).

At 826, the computing system can provide the feature vector as input to a trained machine-learned model (e.g., a machine-learned model that has been trained to determine target offset from a nominal path predictions for regions of the vehicle's nominal path based at least in part on the obtained features) to be used in generating machine-learned model output data. A machine-learned model into which a feature vector can be provided as input at 826 can correspond, for example, to a machine-learned model 124 of FIG. 1, machine-learned model 1110 of FIG. 11, and/or machine-learned model 1140 of FIG. 11.

At 828, the computing system can receive nominal path offset data as an output of the machine-learned model. For example, the machine-learned model could provide a prediction of a target offset from the nominal path, for example, to optimize the positioning of the autonomous vehicle in a roadway based on the context around the vehicle.

At 830, the computing system can provide the nominal path offset data for use in determining a motion plan for the autonomous vehicle, for example, by the motion planning system 114. For instance, based on a model output, an autonomous vehicle motion plan could adjust the nominal path of the autonomous vehicle by a certain offset amount to safely travel through certain context scenarios, such as on busy streets with numerous pedestrians and/or parked vehicles.

Figure 9:
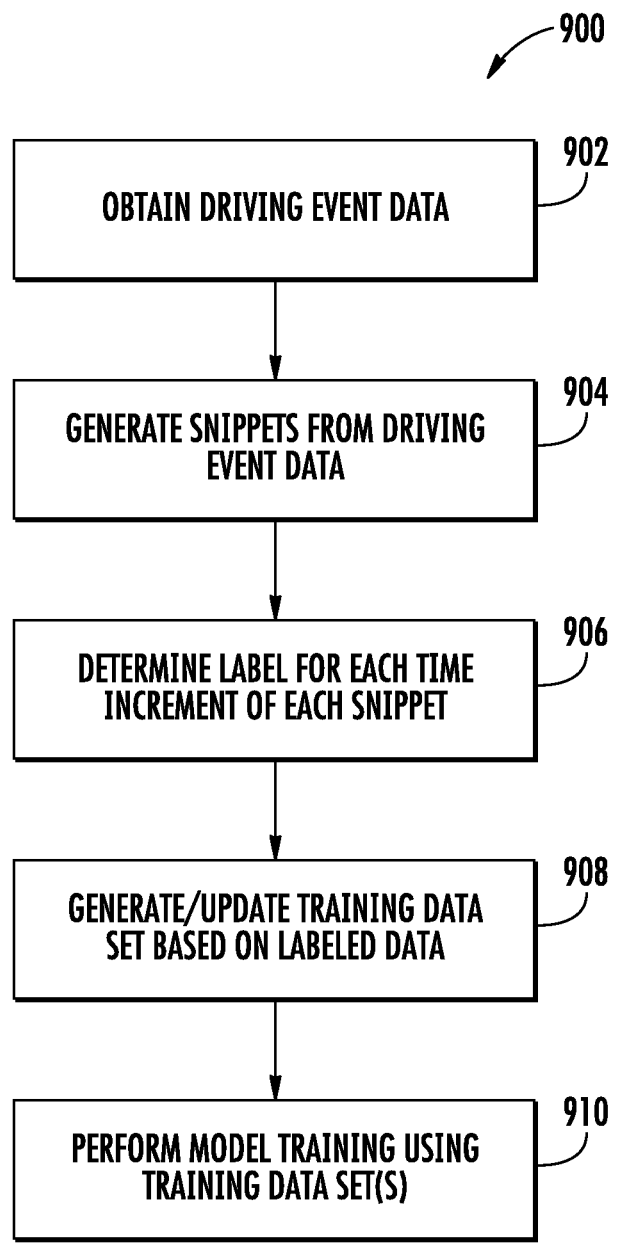
FIG. 9 depicts a flowchart diagram of example operations for training a machine learning model according to example embodiments of the present disclosure.

FIG. 9 depicts a flowchart diagram of example operations 900 for training a machine learning model according to example embodiments of the present disclosure. One or more portion(s) of the operations 900 can be implemented by one or more computing devices such as, for example, the computing system 1130 of FIG. 11, the computing system 1102 of FIG. 11, the vehicle computing system 106 of FIG. 1, or the like. Moreover, one or more portion(s) of the operations 900 can be implemented as an algorithm on the hardware components of the device(s) described herein (e.g., as in FIGS. 1 and 11) to, for example, provide training of a machine learning model.

At 902, one or more computing devices included within a computing system can obtain vehicle driving event data. For instance, driving event data can be extracted from driving logs for one or more autonomous vehicles and/or manually driven vehicles within a fleet.

At 904, the computing system can generate context scenario snippets based on the driving event data. For example, data can be captured when a vehicle changes speed and this data can be used to generate snippets. In another example, event data can be analyzed for certain situations and the data can be used to generate snippets. In a further example, snippets can be generated using driving event data from simulations, such as driving simulations using a test track and/or simulated real world scenarios.

At 906, a label can be determined for each time increment of each snippet to generate training data for training a machine-learning model. For example, a speed label can be determined for each time step of the snippet indicating a desired speed that a vehicle can travel based on the context scenario of the snippet. In some cases, the label indicate that no caution is needed (e.g., an autonomous vehicle can drive at the posted speed limit) for a time step of the snippet based on the context. Additionally or alternatively, one or more time increments of a snippet can be labeled with a target offset from the nominal path based on the context.

At 908, the computing system can generate and/or update one or more sets of model training data based on the labeled snippets.

At 910, the computing system can use one or more of the training data sets to perform training of a machine learning model to provide speed limit context awareness. For instance, supervised training techniques can be performed to train the model (e.g., using labeled driving log data, etc.) to determine a maximum speed limit prediction based at least in part on the features associated with a context region and the autonomous vehicle current position.

Figure 10:
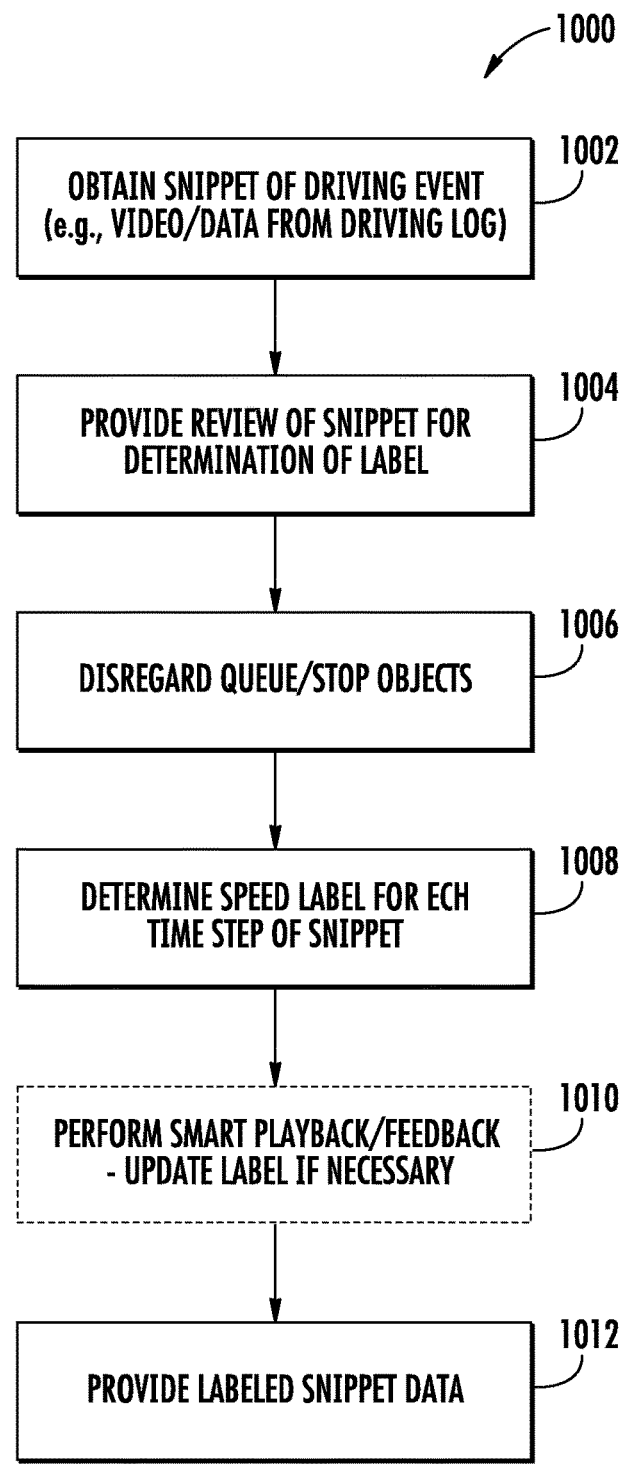
FIG. 10 depicts a flowchart diagram of example operations for generating labeled training data according to example embodiments of the present disclosure.

FIG. 10 depicts a flowchart diagram of example operations 1000 for generating labeled training data according to example embodiments of the present disclosure. One or more portion(s) of the operations 1000 can be implemented by one or more computing devices such as, for example, the computing system 1130 of FIG. 11, the computing system 1102 of FIG. 11, the vehicle computing system 106 of FIG. 1, or the like. Moreover, one or more portion(s) of the operations 1000 can be implemented as an algorithm on the hardware components of the device(s) described herein (e.g., as in FIGS. 1 and 11) to, for example, provide training of a machine learning model.

At 1002, one or more computing devices included within a computing system can obtain a snippet of a driving event (e.g., sensor data and/or video data) from a driving log. In some implementations, the snippet can be divided into time steps for use in labeling increments of the snippet to develop model training data.

At 1004, the computing system can provide for review of the snippet data (e.g., sensor and/or video data) for determination of training labels.

At 1006, one or more queued and/or stopped objects within the snippet can be disregarded during review of the snippet.

At 1008, maximum speed and/or nominal path offset labels can be determined for each time step of the snippet.

At 1010, the computing system can optionally provide smart playback of the snippet, for example, by modifying the playback speed of the snippet based on speed labels, to provide feedback on the appropriateness of the labeling. Based on the smart playback, one or more speed labels for the snippet can be updated.

At 1012, the computing system can provide the labeled snippet data for inclusion in a training data set for a machine learning model.

Although FIG. 6-10 depict steps performed in a particular order for purposes of illustration and discussion, the methods of the present disclosure are not limited to the particularly illustrated order or arrangement. The various steps of the methods 600, 700, and 800 can be omitted, rearranged, combined, and/or adapted in various ways without deviating from the scope of the present disclosure.

Figure 11:
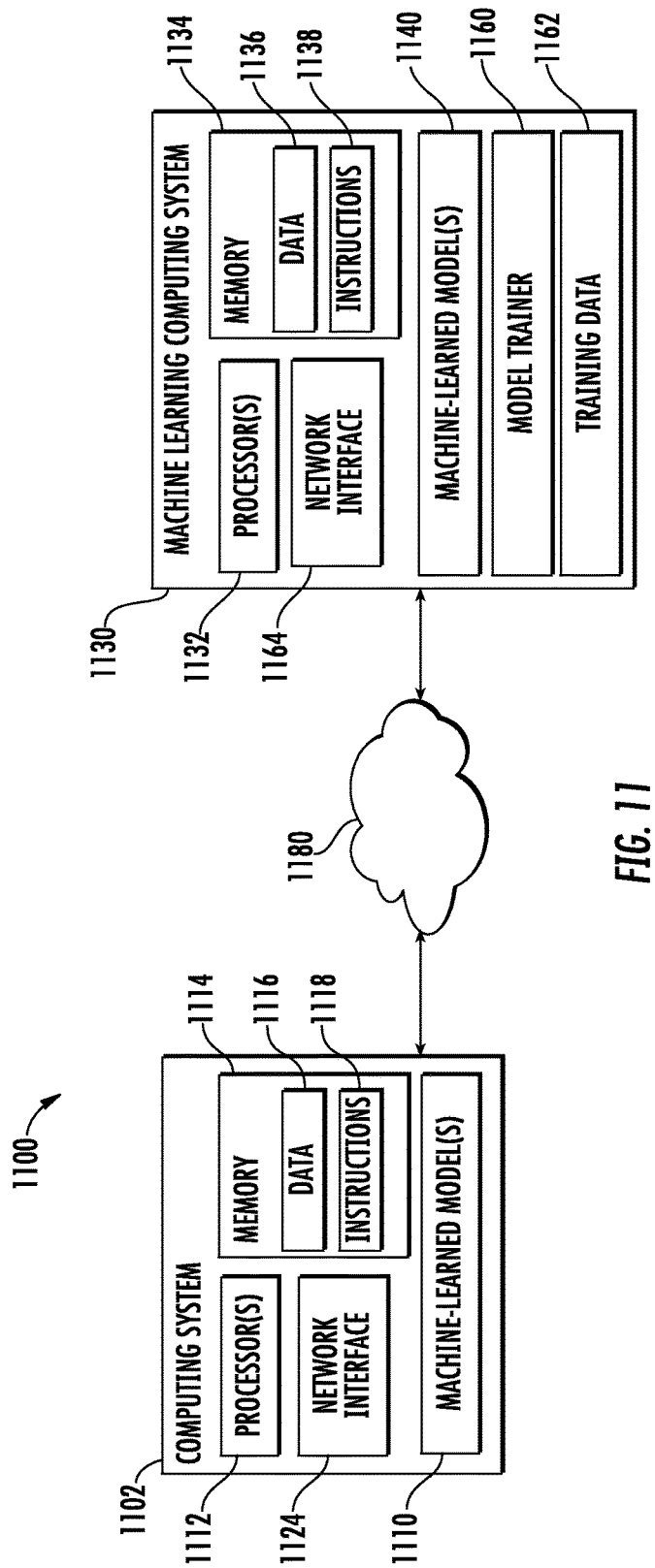
FIG. 11 depicts a block diagram of an example computing system according to example embodiments of the present disclosure.

FIG. 11 depicts a block diagram of an example computing system 1100 according to example embodiments of the present disclosure. The example system 1100 includes a computing system 1102 and a machine learning computing system 1130 that are communicatively coupled over a network 1180.

In some implementations, the computing system 1102 can perform autonomous vehicle motion planning including determining a maximum speed limit for one or more segments of a nominal path of the autonomous vehicle. In some implementations, the computing system 1102 can be included in an autonomous vehicle. For example, the computing system 1102 can be on-board the autonomous vehicle. In other implementations, the computing system 1102 is not located on-board the autonomous vehicle. For example, the computing system 1102 can operate offline to perform object detection including making object class predictions and object location/orientation estimations. The computing system 1102 can include one or more distinct physical computing devices.

The computing system 1102 includes one or more processors 1112 and a memory 1114. The one or more processors 1112 can be any suitable processing device (e.g., a processor core, a microprocessor, an ASIC, a FPGA, a controller, a microcontroller, etc.) and can be one processor or a plurality of processors that are operatively connected. The memory 1114 can include one or more non-transitory computer-readable storage media, such as RAM, ROM, EEPROM, EPROM, one or more memory devices, flash memory devices, etc., and combinations thereof.

The memory 1114 can store information that can be accessed by the one or more processors 1112. For instance, the memory 1114 (e.g., one or more non-transitory computer-readable storage mediums, memory devices) can store data 1116 that can be obtained, received, accessed, written, manipulated, created, and/or stored. The data 1116 can include, for instance, sensor data, map data, data identifying detected objects including current object states and predicted object locations and/or trajectories, autonomous vehicle and/or context features, motion plans, machine-learned models, rules, etc. as described herein. In some implementations, the computing system 1102 can obtain data from one or more memory device(s) that are remote from the system 1102.

The memory 1114 can also store computer-readable instructions 1118 that can be executed by the one or more processors 1112. The instructions 1118 can be software written in any suitable programming language or can be implemented in hardware. Additionally, or alternatively, the instructions 1118 can be executed in logically and/or virtually separate threads on processor(s) 1112.

For example, the memory 1114 can store instructions 1118 that when executed by the one or more processors 1112 cause the one or more processors 1112 to perform any of the operations and/or functions described herein, including, for example, operations of FIG. 6-10.

According to an aspect of the present disclosure, the computing system 1102 can store or include one or more machine-learned models 1110. As examples, the machine-learned models 1110 can be or can otherwise include various machine-learned models such as, for example, neural networks (e.g., deep neural networks), support vector machines, decision trees, random forest models, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

In some implementations, the computing system 1102 can receive the one or more machine-learned models 1110 from the machine learning computing system 1130 over network 1180 and can store the one or more machine-learned models 1110 in the memory 1114. The computing system 1102 can then use or otherwise implement the one or more machine-learned models 1110 (e.g., by processor(s) 1112). In particular, the computing system 1102 can implement the machine learned model(s) 1110 to enable maximum speed limit predictions/determinations, and/or nominal path offset predictions/determinations, based on the context around an autonomous vehicle.

For example, in some implementations, the computing system 1102 can employ the machine-learned model(s) 1110 by inputting a feature vector into the machine-learned model(s) 1110 and receiving a prediction of the maximum speed limit and/or offset to a nominal path for one or more segments of a nominal path of an autonomous vehicle as an output of the machine-learned model(s) 1110.

The machine learning computing system 1130 includes one or more processors 1132 and a memory 1134. The one or more processors 1132 can be any suitable processing device (e.g., a processor core, a microprocessor, an ASIC, a FPGA, a controller, a microcontroller, etc.) and can be one processor or a plurality of processors that are operatively connected. The memory 1134 can include one or more non-transitory computer-readable storage media, such as RAM, ROM, EEPROM, EPROM, one or more memory devices, flash memory devices, etc., and combinations thereof.

The memory 1134 can store information that can be accessed by the one or more processors 1132. For instance, the memory 1134 (e.g., one or more non-transitory computer-readable storage mediums, memory devices) can store data 1136 that can be obtained, received, accessed, written, manipulated, created, and/or stored. The data 1136 can include, for instance, sensor data, map data, data identifying detected objects including current object states and predicted object locations and/or trajectories, motion plans, autonomous vehicle features, context features, driving log data, machine-learned models, model training data, rules, etc. as described herein. In some implementations, the machine learning computing system 1130 can obtain data from one or more memory device(s) that are remote from the system 1130.

The memory 1134 can also store computer-readable instructions 1138 that can be executed by the one or more processors 1132. The instructions 1138 can be software written in any suitable programming language or can be implemented in hardware. Additionally, or alternatively, the instructions 1138 can be executed in logically and/or virtually separate threads on processor(s) 1132.

For example, the memory 1134 can store instructions 1138 that when executed by the one or more processors 1132 cause the one or more processors 1132 to perform any of the operations and/or functions described herein, including, for example, operations of FIG. 6-10.

In some implementations, the machine learning computing system 1130 includes one or more server computing devices. If the machine learning computing system 1130 includes multiple server computing devices, such server computing devices can operate according to various computing architectures, including, for example, sequential computing architectures, parallel computing architectures, or some combination thereof.

In addition or alternatively to the model(s) 1110 at the computing system 1102, the machine learning computing system 1130 can include one or more machine-learned models 1140. As examples, the machine-learned models 1140 can be or can otherwise include various machine-learned models such as, for example, neural networks (e.g., deep neural networks), support vector machines, decision trees, random forest models, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

As an example, the machine learning computing system 1130 can communicate with the computing system 1102 according to a client-server relationship. For example, the machine learning computing system 1130 can implement the machine-learned models 1140 to provide a service to the computing system 1102. For example, the service can provide an autonomous vehicle motion planning service.

Thus, machine-learned models 1110 can be located and used at the computing system 1102 and/or machine-learned models 1140 can be located and used at the machine learning computing system 1130.

In some implementations, the machine learning computing system 1130 and/or the computing system 1102 can train the machine-learned models 1110 and/or 1140 through use of a model trainer 1160. The model trainer 1160 can train the machine-learned models 1110 and/or 1140 using one or more training or learning algorithms. One example training technique is backwards propagation of errors. In some implementations, the model trainer 1160 can perform supervised training techniques using a set of labeled training data. In other implementations, the model trainer 1160 can perform unsupervised training techniques using a set of unlabeled training data. The model trainer 1160 can perform a number of generalization techniques to improve the generalization capability of the models being trained. Generalization techniques include weight decays, dropouts, or other techniques.

In particular, the model trainer 1160 can train a machine-learned model 1110 and/or 1140 based on one or more sets of training data 1162. The training data 1162 can include, for example, vehicle driving log data which can include labels for driving events, driving speeds, path offsets, and/or the like. The model trainer 1160 can be implemented in hardware, firmware, and/or software controlling one or more processors.

The computing system 1102 can also include a network interface 1124 used to communicate with one or more systems or devices, including systems or devices that are remotely located from the computing system 1102. The network interface 1124 can include any circuits, components, software, etc. for communicating with one or more networks (e.g., 1180). In some implementations, the network interface 1124 can include, for example, one or more of a communications controller, receiver, transceiver, transmitter, port, conductors, software, and/or hardware for communicating data. Similarly, the machine learning computing system 1130 can include a network interface 1164.

The network(s) 1180 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 1180 can be accomplished, for instance, via a network interface using any type of protocol, protection scheme, encoding, format, packaging, etc.

FIG. 11 illustrates one example computing system 1100 that can be used to implement the present disclosure. Other computing systems can be used as well. For example, in some implementations, the computing system 1102 can include the model trainer 1160 and the training dataset 1162. In such implementations, the machine-learned models 1110 can be both trained and used locally at the computing system 1102. As another example, in some implementations, the computing system 1102 is not connected to other computing systems.

In addition, components illustrated and/or discussed as being included in one of the computing systems 1102 or 1130 can instead be included in another of the computing systems 1102 or 1130. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices. While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for applying speed limit context awareness in autonomous vehicle operation comprising:
    obtaining, by a computing system comprising one or more computing devices, a plurality of features descriptive of a current context of one or more regions around an autonomous vehicle path and a state of an autonomous vehicle;
    generating, by the computing system, a feature vector based at least in part on the plurality of features descriptive of the current context of one or more regions around the autonomous vehicle path and the state of the autonomous vehicle;
    inputting, by the computing system, the feature vector to a machine-learned model;
    obtaining, by the computing system, a context response to be used in control of the autonomous vehicle based at least in part on the machine-learned model and the plurality of features, wherein the context response includes a derived speed constraint for the autonomous vehicle comprising a modification from a posted vehicle speed for the autonomous vehicle path, wherein the context response comprises speed limits to be applied for one or more segment of the autonomous vehicle path ahead of the autonomous vehicle;
    providing, by the computing system, the context response to a motion planning application of the autonomous vehicle to determine a motion plan for the autonomous vehicle; and
    providing, by the computing system, vehicle control data to one or more controllers associated with the autonomous vehicle based in part on the motion plan for the autonomous vehicle to control operation of the autonomous vehicle.

2. The computer-implemented method of claim 1, wherein the context response comprises a maximum speed limit to be applied at a future time instance.

3. The computer-implemented method of claim 1, wherein the context response comprises an offset from a nominal path to be applied at a future time instance.

4. The computer-implemented method of claim 1, further comprising:
    identifying, by the computing system, a nominal path associated with the autonomous vehicle;
    determining, by the computing system, a plurality of context regions for the nominal path; and
    determining for each of the plurality of context regions, by the computing system, one or more features descriptive of a context of the autonomous vehicle associated with each context region.

5. The computer-implemented method of claim 1, wherein the plurality of features comprise (i) features regarding aggregate information about objects in a context region around a nominal path associated with the autonomous vehicle and (ii) features relative to a current position of the autonomous vehicle.

6. The computer-implemented method of claim 5, wherein the features regarding aggregate information about objects in the context region comprise one or more of: average distance to pedestrians to left; average distance to pedestrians to right; speed of a closest pedestrian on left; speed of a closest pedestrian on right; distance to a nominal path of the closest pedestrian on the left; distance to a nominal path of the closest pedestrian on the right; distribution of pedestrians to left of the nominal path; distribution of pedestrians to right of the nominal path; average distance to other vehicles on left; average distance to other vehicles on right; speed of a closest other vehicle on left; speed of a closest other vehicle on right; distance to a nominal path of the closest other vehicle on the left; distance to a nominal path of the closest other vehicle on the right; distribution of other vehicles to left of the nominal path; distribution of other vehicles to right of the nominal path; minimum gap for all objects in the context region; maximum curvature along the nominal path in the context region; closest distance between road boundary to left and the autonomous vehicle in the context region; average distance to left of the autonomous vehicle; closest distance between road boundary to right and the autonomous vehicle in the context region; average distance to right of the autonomous vehicle; rendered overhead-view image of upcoming path; and camera image in a direction of a future path.

7. The computer-implemented method of claim 5, wherein the features relative to the current position of the autonomous vehicle comprise one or more of: a posted speed limit; distance to a traffic control device; distance from nose of the autonomous vehicle to a closest queue object along the nominal path; speed of the closest queue object; and acceleration of the closest queue object.

8. The computer-implemented method of claim 1, wherein the plurality of features comprise:
  autonomous vehicle feature data descriptive of features that occur once within a context region of a nominal path associated with the autonomous vehicle; and
  context feature data descriptive of aggregate information about objects in each context region around the nominal path associated with the autonomous vehicle; and
  wherein the autonomous vehicle feature data and context feature data is concatenated to generate the feature vector.

9. An autonomous vehicle comprising:
  a machine-learned model that has been trained to determine a context response based at least in part on features associated with a current context of one or more regions around an autonomous vehicle path and a state of the autonomous vehicle;
a vehicle computing system comprising:
  one or more processors; and
  one or more memories including instructions that, when executed by the one or more processors, cause the one or more processors to perform operations, the operations comprising:
    obtaining a plurality of features descriptive of the current context of one or more regions around the autonomous vehicle path and the state of the autonomous vehicle;
    generating a feature vector based at least in part on the plurality of features descriptive of the current context of one or more regions around the autonomous vehicle path and the state of the autonomous vehicle;
    inputting the feature vector to the machine-learned model;
    obtaining a context response as an output of the machine-learned model, wherein the context response includes a derived speed constraint for the autonomous vehicle comprising a modification from a posted vehicle speed for the autonomous vehicle path, wherein the context response comprises speed limits to be applied for one or more segment of the autonomous vehicle path ahead of the autonomous vehicle;
    providing the context response to a motion planning application of the autonomous vehicle to determine a motion plan for the autonomous vehicle; and
    providing vehicle control data to one or more controllers associated with the autonomous vehicle based in part on the motion plan for the autonomous vehicle to control operation of the autonomous vehicle.

10. The autonomous vehicle of claim 9, wherein the context response comprises a maximum speed limit to be applied at a future time instance.

11. The autonomous vehicle of claim 9, wherein the context response comprises an offset from a nominal path to be applied at a future time instance.

12. The autonomous vehicle of claim 9, wherein the operations further comprise:
  identifying a nominal path associated with the autonomous vehicle;
  determining a plurality of context regions for the nominal path; and
  determining for each of the plurality of context regions, one or more features descriptive of the context of the autonomous vehicle associated with each context region.

13. The autonomous vehicle of claim 9, wherein the plurality of features comprise (i) features regarding aggregate information about objects in a context region around a nominal path associated with the autonomous vehicle and (ii) features relative to a current position of the autonomous vehicle.

14. The autonomous vehicle of claim 9, wherein the plurality of features comprise:
  autonomous vehicle feature data descriptive of features that occur once within a context region of a nominal path associated with the autonomous vehicle; and
  context feature data descriptive of aggregate information about objects in each context region around the nominal path associated with the autonomous vehicle; and
  wherein the autonomous vehicle feature data and context feature data is concatenated to generate the feature vector.

15. A computing system comprising:
one or more processors; and
one or more memories including instructions that, when executed by the one or more processors, cause the one or more processors to perform operations, the operations comprising:
  obtaining a plurality of features descriptive of a current context of one or more regions around an autonomous vehicle path and a state of an autonomous vehicle;
  generating, by the computing system, a feature vector based at least in part on the plurality of features descriptive of the current context of one or more regions around the autonomous vehicle path and the state of the autonomous vehicle;
  inputting, by the computing system, the feature vector to a machine-learned model;
  obtaining a context response to be used in control of the autonomous vehicle based at least in part on the machine-learned model and the plurality of features, wherein the context response includes a derived speed constraint for the autonomous vehicle comprising a modification from a posted vehicle speed for the autonomous vehicle path, wherein the context response comprises speed limits to be applied for one or more segment of the autonomous vehicle path ahead of the autonomous vehicle;
  providing the context response to a motion planning application of the autonomous vehicle to determine a motion plan for the autonomous vehicle; and
  providing vehicle control data to one or more controllers associated with the autonomous vehicle based in part on the motion plan for the autonomous vehicle to control operation of the autonomous vehicle.

16. The computing system of claim 15, wherein the context response comprises a maximum speed limit to be applied at a future time instance.

17. The computing system of claim 15, wherein the context response comprises an offset from a nominal path to be applied at a future time instance.

* * * * *